(12) United States Patent
Kullmann et al.

(10) Patent No.: US 10,363,620 B2
(45) Date of Patent: Jul. 30, 2019

(54) SAW BAND INCLUDING A CHIP SEPARATOR TOOTH

(71) Applicant: WIKUS-Saegenfabrik Wilhelm H. Kullmann GmbH & Co. KG, Spangenberg (DE)

(72) Inventors: Joerg H. Kullmann, Spangenberg (DE); Dirk Heimel, Felsberg (DE)

(73) Assignee: WIKUS-SAEGENFABRIK WILHELM H. KULLMANN GMBH & CO. KG, Spangenberg (DE)

( * ) Notice: Subject to any disclaimer, the term of this patent is extended or adjusted under 35 U.S.C. 154(b) by 0 days.

(21) Appl. No.: 15/936,943

(22) Filed: Mar. 27, 2018

(65) Prior Publication Data
US 2018/0236575 A1    Aug. 23, 2018

Related U.S. Application Data

(63) Continuation of application No. PCT/EP2016/073450, filed on Sep. 30, 2016.

(30) Foreign Application Priority Data

Oct. 2, 2015  (DE) .......................... 10 2015 116 747

(51) Int. Cl.
*B23D 61/12*   (2006.01)

(52) U.S. Cl.
CPC .......... *B23D 61/121* (2013.01); *B23D 61/123* (2013.01)

(58) Field of Classification Search
CPC .. B23D 61/00; B23D 61/121; B23D 61/0122; B23D 61/123; B23D 61/126; B23D 61/14; B23D 61/16
See application file for complete search history.

(56) References Cited

U.S. PATENT DOCUMENTS

| | | | |
|---|---|---|---|
| 3,576,200 A | 4/1971 | Elmes | |
| 4,913,022 A * | 4/1990 | Kuklinski | B23D 61/121 83/835 |
| 5,062,338 A * | 11/1991 | Baker | B23D 61/121 83/835 |
| 5,249,485 A * | 10/1993 | Hayden, Sr. | B23D 61/121 76/112 |

(Continued)

FOREIGN PATENT DOCUMENTS

| | | |
|---|---|---|
| DE | 25 16 137 A1 | 10/1976 |
| DE | 42 00 423 A1 | 7/1993 |

(Continued)

OTHER PUBLICATIONS

International Preliminary Report on Patentability in co-pending, related PCT Application No. PCT/EP2016I073450 dated Apr. 3, 2018.

*Primary Examiner* — Jennifer B Swinney
*Assistant Examiner* — Richard D Crosby, Jr.
(74) *Attorney, Agent, or Firm* — Thomas | Horstemeyer, LLP

(57) ABSTRACT

A saw band (1) includes a chamfered tooth (10) including two effective cutting edge portions (7) being arranged in the region of the chamfer (15) between which an ineffective cutting edge portion (8) of the first tooth (10, 11) is formed. In this way, five cutting channel portions (18) are formed by only two geometrically differently designed teeth (10).

10 Claims, 32 Drawing Sheets

(56) References Cited

U.S. PATENT DOCUMENTS

| | | | | |
|---|---|---|---|---|
| 5,410,935 A * | 5/1995 | Holston | B23D 61/121 | 83/835 |
| 5,832,803 A * | 11/1998 | Hayden, Sr. | B23D 61/121 | 83/661 |
| 6,022,353 A * | 2/2000 | Fletcher | B23D 51/10 | 606/79 |
| 6,220,139 B1 * | 4/2001 | Kobayashi | B23D 61/121 | 83/835 |
| 8,695,470 B2 * | 4/2014 | Kullmann | B23D 61/021 | 83/661 |
| 2008/0307936 A1 * | 12/2008 | Elliston | B23D 61/121 | 83/13 |
| 2009/0145280 A1 * | 6/2009 | Bucks | B23D 61/121 | 83/835 |
| 2011/0154970 A1 * | 6/2011 | Oshibe | B23D 61/121 | 83/835 |
| 2012/0000338 A1 * | 1/2012 | Elliston | B23D 61/121 | 83/848 |
| 2013/0133500 A1 * | 5/2013 | Horiguchi | B23D 61/121 | 83/661 |
| 2013/0180375 A1 * | 7/2013 | Rearick | B23D 61/121 | 83/849 |
| 2015/0190871 A1 * | 7/2015 | Dexter | B23D 61/121 | 83/851 |
| 2016/0008899 A1 * | 1/2016 | Hunter | B23D 61/121 | 83/849 |
| 2017/0056989 A1 * | 3/2017 | Vogel | B23D 61/121 | |
| 2017/0297124 A1 * | 10/2017 | Rakurty | B23D 61/121 | |
| 2017/0355030 A1 * | 12/2017 | Fowler | B23D 61/121 | |
| 2018/0099341 A1 * | 4/2018 | Rakurty | B23D 61/14 | |
| 2018/0236575 A1 * | 8/2018 | Kullmann | B23D 61/121 | |
| 2019/0054553 A1 * | 2/2019 | Hunter | B23D 61/121 | |
| 2019/0091775 A1 * | 3/2019 | Beach | B23D 61/021 | |

FOREIGN PATENT DOCUMENTS

| | | |
|---|---|---|
| DE | 43 00 622 A1 | 7/1994 |
| DE | 197 39 074 A1 | 3/1999 |
| DE | 10 2014 205 445 A1 | 9/2015 |
| JP | S56 176126 U | 5/1955 |
| JP | 2009 066730 A | 9/2007 |
| WO | 2006/090828 A1 | 8/2006 |

* cited by examiner

SAW BAND INCLUDING A CHIP SEPARATOR TOOTH

CROSS REFERENCE TO RELATED APPLICATIONS

This application is a continuation of International Application PCT/EP2016/073450 entitled "Saw blade having a chip-splitting tooth" with an international filing date of Sep. 30, 2016 and claiming priority to German Patent Application No. DE 10 2015 116 747.6 filed on Oct. 2, 2015.

FIELD OF THE INVENTION

The present invention relates to a saw band of metal including a tooth supporting body and a plurality of teeth being arranged at the tooth supporting body.

Such saw bands may be especially designed as an elongated saw band of metal having a linear arrangement of teeth one after the other, and they may serve to cut work pieces of metal.

BACKGROUND OF THE INVENTION

A saw band including a tooth supporting body and a plurality of teeth being connected to the tooth supporting body are known from German Patent Application DE 42 00 423 A1. This saw band is also known under the trademark "FUTURA" of the applicant. The teeth are designed as unset positively conical chamfered teeth having being located in the group in a heights and widths graduation, the group being repeated along the length of the tooth supporting body. The group includes the widest and lowest tooth as surface tooth and the other teeth as performance teeth. In this way, for example, seven cutting channel portions are formed by four geometrically differently designed teeth.

Another saw band including a base body and a plurality of teeth being connected to the base body is known from German patent application DE 43 00 622 A1. This saw band is known under the trademark "FUTURA PLUS" of the applicant. The teeth are designed as unset positively conical chamfered teeth being located in two groups being repeated along the tooth supporting body in a groupwise intermixed arrangement. In the first group, the teeth are arranged in a heights and widths graduation and form the performance teeth. The teeth in the second group are identical among one another, and they are the teeth having the greatest width and thus the surface teeth. In this way, for example, seven cutting channel portions are formed by four geometrically differently designed teeth.

A saw band including a base body and a plurality of teeth being connected to the base body is further known from German patent application DE 197 39 074 A1. This saw band is known under the trademark "SELEKTA" of the applicant. The teeth are arranged in a group being repeated along the base body. The group includes an even number of set teeth being arranged directly one after the other and forming the surface teeth. The group further includes an unset tooth having the greatest height of the teeth and forming the performance tooth. The decreased height of the surface teeth has been realized by elastic and plastic deformation, especially by upsetting. In this way, three cutting channel portions are formed by three geometrically differently designed teeth.

A saw band including a tooth supporting body and a plurality of teeth being connected to the tooth supporting body including exactly two geometrically differently designed teeth is generally known in the prior art as pre-cutter and finishing cutter. Both types of teeth are designed to be unset and symmetrical with respect to the longitudinal center plane of the tooth supporting body. The pre-cutter tooth is chamfered, and it has a greater height than the finishing cutter tooth. The finishing cutter tooth is chamfered or non-chamfered, and it has a greater width at the height of its cutting edge than the pre-cutter tooth. Such a tooth geometry is also designated as "triple chip" geometry since three chips are removed thereby along the length of the cutting channel. Thus, three cutting channel portions are formed by two geometrically differently designed teeth.

A circular saw blade for cutting metal is known from German patent application DE 25 16 137. The circular saw blade includes exactly two geometrically differently designed teeth. The teeth have the same width and the same height, and they are differently chamfered. They are designed such that their flanks being located at an angle of 0° overlap in the projection.

A circular saw blade for cutting non-metallic work pieces is known from German patent application DE 10 2014 205 445 A1. According to an embodiment illustrated in FIG. 4, the circular saw blade includes exactly two geometrically differently designed teeth. The teeth have the same width and different heights, and they are designed such that their flanks being located at an angle of 0° overlap in the projection.

A circular saw blade is known from Japanese patent application JP S56 176125 U. The embodiment of the circular saw blade illustrated in FIG. 4 includes two geometrically differently designed teeth. The teeth have a different height and a different width. The first tooth has a greater height and is designed to be chamfered. The second tooth is smaller and designed not to be chamfered. Both teeth have a flank angle of slightly more than 0°. The second tooth is designed and arranged such that its flank in the view from the front intersects the chamfer of the first tooth and does not overlap the flank of the first tooth. From FIG. 6, another embodiment is known in which three geometrically differently designed teeth are arranged at the circular saw blade. The teeth have different heights and widths. The first tooth is the highest and broadest tooth and chamfered. The second tooth is the second highest and slimmest tooth and not chamfered. The third tooth is the smallest and second widest tooth and not chamfered. All teeth have flank angles being slightly greater than 0°. The second tooth is designed and arranged such that its flank in the view from the front intersects the chamfer of the first tooth and does not overlap the flank of the first tooth. The third tooth is designed and arranged such that its flank in the view from the front intersects the chamfer of the first tooth and does not cover the flank of the first tooth. The second tooth is furthermore designed such that its flank in the view from the front intersects the straight cutting portion of the third tooth.

Another circular saw blade is known from U.S. Pat. No. 3,576,200. The circular saw blade includes two geometrically differently designed teeth. The first tooth is the highest and broadest tooth and is chamfered. The second tooth is lower and less wide and not chamfered. Both teeth have a positive flank angle. The second tooth is designed and arranged such that its flank in the view from the front intersects the chamfer of the first tooth and does not overlap the flank of the first tooth.

A saw band is known from international patent application WO 2006/090828 A1. In the embodiment illustrated in FIG. 5, the saw band includes three geometrically differently designed teeth. The first tooth is the highest tooth and chamfered. The second tooth is the second highest tooth and not chamfered. The third tooth is the smallest tooth, the widest tooth and not chamfered. All teeth have a positive flank angle. The second tooth is designed and arranged such that its flank in the view from the front intersects the chamfer of the first tooth and does not overlap the flank of the first tooth. The third tooth is designed and arranged such that its flank does not intersect the chamfer of the first tooth and overlaps the flank of the first tooth. In FIG. 7, another embodiment of the saw band including four geometrically differently designed teeth is illustrated. The first tooth is the highest tooth and chamfered. The second tooth is the second highest tooth and not chamfered. The third tooth is the third highest tooth and not chamfered. The fourth tooth is the smallest and widest tooth and not chamfered. All teeth with the exception of the second tooth have a positive flank angle. The second tooth has a flank angle of 0°. The second tooth is designed and arranged such that its flank in the view from the front intersects the chamfer of the first tooth and does not overlap the flank of the first tooth.

A saw band is known from Japanese patent application JP 2009 066730 A. According to the embodiment illustrated in FIG. 4, the saw band includes three geometrically differently designed teeth. The first tooth is the highest tooth and chamfered. The second tooth is the second highest tooth and not chamfered. The third tooth is the smallest and widest tooth and not chamfered. The first tooth and the third tooth have a positive flank angle. The second tooth has a negative flank angle. The second tooth is designed and arranged such that its flank in the view from the front intersects the chamfer of the first tooth and does not overlap the flank of the first tooth. The third tooth is designed and arranged such that its flank overlaps the flank of the first tooth.

SUMMARY OF THE INVENTION

Definitions

Cutting channel: A cutting channel is to be understood in this application as the channel resulting in the material to be cut due to the saw band. This channel results from removal of chips by the teeth of the saw band.

Cutting channel portion: A cutting channel portion is to be understood in this application as a partial section of the cutting channel in which a chip being continuous in the direction of its width is removed. These are strip-like portions which, for example, are illustrated as cross-hatched portions in FIG. 4.

Effective cutting edge portion: An effective cutting edge portion is to be understood in this application as a portion of the cutting edge of the cutting portion of a tooth of the saw band which is dimensioned and arranged with respect to the other teeth of the saw blade such that it contacts the material to be cut during sawing and thus removes chips.

Ineffective cutting edge portion: An ineffective cutting edge portion is to be understood in this application as a portion of a cutting edge of a cutting portion of a tooth of the saw band which, due to its dimensioning and arrangement with respect to the other teeth, does not contact the material to be cut during sawing and thus does not remove chips.

Surface tooth: A surface tooth is to be understood in this application as a tooth of the saw band being responsible for the surface quality of the cut work piece.

Thus, a surface tooth is a tooth defining an outer lateral limit as seen in the projection of the saw band in or against the direction of movement of the saw band. If the surface tooth is an unset tooth, this means that the surface tooth is the widest tooth (see FIG. 4, for example). If the surface tooth is a set tooth, this means that the setting width is chosen such that the set tooth laterally protrudes beyond the other teeth as described above as seen in the above-described projection (see FIG. 27, for example).

Performance tooth: A performance tooth is to be understood in this application as a tooth of the saw band which, in contrast to the surface teeth, is substantially responsible for the cutting performance of the saw band. Such a tooth thus, at least with certain parts, protrudes with respect to the other teeth in the feed direction. In the above-described projection in the direction of movement of the saw band (see FIG. 4, for example), such a performance tooth thus is a tooth removing chips in an inner portion of the cutting channel facing away from its surface.

Chip separator tooth: A chip separator tooth is to be understood in this application as a tooth of the saw band serving to separate, divide, partition and isolate, respectively, a chip along its width into a plurality of chips. The chips resulting therefrom thus have a smaller width. Such a chip separator tooth may also be designated as chip width separator tooth, chip dividing tooth, chip width dividing tooth, chip isolating tooth, chip interrupting tooth, cutting channel separator tooth, cutting channel portion separator tooth, cutting channel portion forming tooth, quintuple tooth or TAURUS® tooth.

Positively conical tooth: A positively conical tooth is to be understood in this application as a tooth of the saw band which in or against the direction of band movement, as this is illustrated in FIG. 4, for example, has a conical shape diminishing in a downward direction such that its flanks are arranged at a positive clearance angle with respect to the vertical and thus counteracts jamming of the tooth and thus of the saw band in the cutting channel.

Tooth supporting body: A tooth supporting body is to be understood in this application as the part of the saw band at which the teeth of the saw band are arranged. This is also often designated as the "base body" of the saw band. The term "tooth supporting body" is however intended to better express that this is the part of a saw band which itself cannot be designated as a tooth, but instead the part at which the teeth are arranged. It is to be taken into account that there are differences between the functional and the material differentiation between the tooth supporting body and the teeth. Functionally, the tooth begins with its tooth base in the region of the tooth gullet. This tooth base however is often made of the same material as the tooth supporting body, and it is designed as one piece therewith. In other words, a part of this material fulfills the function of the tooth supporting body, and another part fulfills the function of the tooth base and thus of the tooth. The differentiation with respect to the material is then realized further away from the tooth supporting body in the region of the tip of the tooth.

Numbering reference: The reference to teeth or other features in the sense of "first tooth", "second tooth", "first number", "second number", "first direction", "second direction" and so forth serves to initially only differentiate the teeth and other features from each other and does not necessarily indicate in which order they are arranged at the saw band. However, a possibility disclosed thereby is that the teeth are arranged exactly in this order—potentially with the intermediate arrangement of additional teeth.

FURTHER DESCRIPTION

A saw band forming a comparatively great number of cutting channel portions during sawing with a comparatively small number of geometrically differently designed and/or arranged teeth per group is provided. The number of cutting channel portions per tooth is thus increased.

Consequently, the manufacturing costs of the new saw band are reduced compared to a saw band having a greater number of geometrically differently designed teeth. At the same time, the properties of the saw band are improved compared to a saw band of the prior art that has the same number of geometrically differently designed teeth. These advantages are attained by the clever design and arrangement of at least one chip separator tooth in the respective group of teeth.

The chip separator tooth causes the effect that a cutting edge portion of a geometrically differently designed other tooth in the group is divided in different effective and ineffective cutting edge portions. Due to the chip separator tooth, this other tooth thus produces a greater number of chips along the width of the cutting channel.

The new saw band produces a high surface quality of the cut material, has a high performance and nevertheless can be cost-effectively manufactured.

The manufacturing costs are not increased compared to a saw band according to the pre-cutter and finishing cutter technology. This is because the number of grindings to be conducted at the teeth is not or not substantially increased. The manufacturing costs are thus below the ones of a saw band of the prior art in accordance with the group technology.

Due to the chip separator tooth, there is an increased cutting power, an improved first-cut behavior, good directional stability, improved vibration behavior, decreased noise emission and improved surface quality. The first-cut behavior is especially improved since the first tooth (the non-chip separator tooth) is designed as a combined performance and surface tooth and as the tooth having the greatest height. Due to its effective cutting edge in the center of the cutting channel, it functions as the guiding tooth. At the same time, it has the greatest width of the teeth and thus defines the width of the cutting channel. Consequently, the saw band is resistant against deviations.

The first tooth may be especially understood as the highest tooth in the group. The second tooth may be especially understood as the second highest tooth in the group and so forth. However, the teeth may also be designated in accordance with their arrangement in the respective drawing. Then, especially, the tooth in the front may be designated as first tooth, the tooth directly following thereafter may be designated as second tooth and so forth. It is also to be taken into account that the order of teeth within a group may be generally freely chosen.

The ineffective cutting edge portion of the first tooth (the non-chip separator tooth) is caused by a second tooth which is located there. The second tooth thus is designed as a chip separator tooth in relation to the first tooth. The chip separator tooth overlaps this portion of the cutting edge of the first tooth and itself includes an effective cutting edge portion at this place. Since all cutting edge portions are arranged side by side without interruptions along the width of the cutting channel, their sum forms the entire width of the cutting channel. Each cutting channel portion is formed by an effective cutting edge portion of a tooth or of a plurality of teeth. Due to the new chip separator tooth and the new chip separator teeth, respectively, one attains a greater number of cutting channel portions per tooth. This also means that the width of at least some of the cutting channel portions is reduced.

The non-chip separator tooth is designed to be chamfered. This means that it includes a chamfer at least at one side. Preferably, it includes a chamfer at each side. These chamfers may be designed to be symmetrical or asymmetrical.

The chip separator tooth may be designed to be non-chamfered. In this way, the manufacturing expenditure for its production is substantially reduced since grinding of the chamfers is not necessary. However, it is also possible that the chip separator tooth is designed to be chamfered.

All teeth in the group with the exception of one tooth may be designed to be non-chamfered. In this way, the grinding expenditure is minimized.

The chip separator tooth may be designed to be unset. If there only are two geometrically differently designed teeth in the group, the chip separator tooth is designed to be symmetrical with respect to the longitudinal center plane. However, if there are three geometrically differently designed teeth in the group, the chip separator tooth may also be designed to be asymmetrical with respect to the longitudinal center plane. The third tooth is then also a chip separator tooth, and it is designed and arranged asymmetrical and mirror-symmetrical to the other chip separator tooth. Depending on the arrangement, the two chip separator teeth commonly functionally form only one chip separator tooth.

The chip separator tooth is designed and arranged such that its flank in the view from the front (i.e. in the projection against the direction of band movement) intersects the chamfer of the non-chip separator tooth and does not intersect the flank of the non-chip separator tooth. This means especially that the chip separator tooth is designed to be less wide than the non-chip separator tooth. Thus, new space is created to the left and to the right in an outer portion in the cutting channel each for a chip (i.e. the chips one and two) produced by the non-chip separator tooth. As seen in an inward direction, another chip follows, the chip being substantially produced by the chamfer of the non-chip separator tooth (i.e. the chips three and four). A fifth chip is created right in the inside, the chip being substantially formed by the straight cutting edge portion of the performance tooth having the greatest height.

The chip separator tooth has a positive flank angel. This means that it is a positively conical tooth, i.e. a tooth getting smaller as seen from the tip of the tooth towards the tooth supporting body. In this way, jamming of the tooth in the cutting channel is prevented.

The teeth may be especially arranged in a group being repeated along the length of the tooth supporting body. There may be a constant division in the sense of the distances between the teeth in one group as well as the distances between the groups being constant. These distances may be identical or different. However, there may also be a variable division in the sense of the distances between the teeth in one group and/or the distances between the groups being different.

The group may only include two geometrically differently designed teeth. In this case, there are only two different types of teeth in the group. This group is repeatingly arranged at the saw band. It is possible that other groups are also arranged at the saw blade, these groups having a greater number of differently designed teeth.

The group may only include three geometrically differently designed teeth. In this case, there are only three different types of teeth in the group. This group is repeatingly arranged at the saw band. It is possible that other groups are also arranged at the saw blade, these groups having a greater number of differently designed teeth.

It is possible to form five cutting channel portions with two geometrically differently designed teeth in the group of which one tooth is designed as a chip separator tooth. It is possible to form seven cutting channel portions with three geometrically differently designed teeth in the group of which one tooth is designed as a chip separator tooth. It is possible to form nine cutting channel portions with three geometrically differently designed teeth in the group of which two teeth are designed as chip separator teeth. It is possible to form nine cutting channel portions with four geometrically differently designed teeth in the group of which one tooth is designed as a chip separator tooth. It is possible to form eleven cutting channel portions with four geometrically differently designed teeth in the group of which two teeth are designed as chip separator teeth. It is possible to form thirteen cutting channel portions with four geometrically differently designed teeth in the group of which three teeth are designed as chip separator teeth. The same correspondingly applies to five, six, seven or more teeth in the group.

The maximum number of cutting channel portions and correspondingly of the teeth may be determined by the following equation:

$$S=2G-1+2T$$

The following applies thereby:
S=number of cutting channel portions per group
G=total number of teeth in the group
T=number of chip separator teeth in the group The second tooth may be designed as a chip separator tooth in relation to the first tooth, and the third tooth may be designed as a chip separator tooth in relation to the second tooth (see FIG. 10, for example). This means that each chip separator tooth conducts a functional division of the cutting edge portions of the respective other tooth such that a first portion is an effective cutting edge portion, a following second portion is an ineffective cutting edge portion and a following third portion is an effective cutting edge portion.

The third tooth may be designed as a chip separator tooth for the first or the second tooth. If the third tooth is designed as a chip separator tooth for the second tooth—and this tooth in turn is a chip separator tooth for the first tooth-, it is possible to form nine cutting channel portions (see FIG. 10, for example). If the third tooth is designed as chip separator tooth for the first tooth—and this tooth is not designed as a chip separator tooth-, there are seven cutting channel portions (see FIG. 9, for example).

Two of the teeth in the group may be set. Especially, these may be the second and the third tooth, whereas the first tooth is unset. One of the set teeth is then set towards the left and the other tooth towards the right. The tooth being set towards the left thus is the chip separator tooth in relation to the left side of the first tooth and the tooth being set towards the right thus is the chip separator tooth in relation to the right side of the first tooth. The two chip separator teeth thus commonly functionally only form one chip separator tooth.

The chip separator tooth has a smaller height and width than the non-chip separator tooth. The non-chip separator tooth has the greatest maximum height and the greatest maximum width. It thus is a combined performance and surface tooth.

The saw blade may include a first chamfered tooth and a second tooth, the second tooth being designed and arranged such that its flank in the view from the front intersects the chamfer of the first tooth. The second tooth may be designed and arranged such that its flank in the view from the front does not intersect the flank of the first tooth.

The second tooth may be designed and arranged such that its flank in the view from the front intersects the chamfer of the first tooth at a distance from the adjacent outer end of the cutting edge of the first tooth in the direction of the width of the cutting channel, the distance corresponding to at least 5%, especially at least 6.5%, especially at least 8%, especially approximately 10% and/or maximally 18%, especially maximally 18.5%, especially maximally 20% of the width of the cutting channel.

The saw band especially serves to cut work pieces of metal or metal alloys. However, it is also possible to cut different work pieces—especially wood, plastic, carbon fiber reinforced plastic (CFRP) and other composite materials—with such a saw band.

The teeth of the saw band include cutting portions having a geometrically defined shape (in contrast to cutting portions of a geometrically undefined shape; see DIN 8580).

The teeth supporting body and the tooth base are made of metal, especially steel.

The cutting edge and at least a further part of the tips of the teeth is also made of metal. This material is harder than the material of the tooth supporting body such that the saw band is especially suitable for sawing metals. For example, the material may be high-speed steel (HSS), i.e. an alloyed tool steel including tungsten, molybdenum, vanadium, cobalt, nickel and/or titanium as the alloying element. However, other cutting materials are also possible, for example hard metals (carbides, cermets), ceramic cutting materials and diamond. Carbides are understood as sintered carbide hard metals. They often include tungsten carbide as the hard material and cobalt as the binder. Other hard metals include titanium nitride as the hard material and nickel, cobalt and molybdenum as the binder, and they are designated as cermets.

The cutting portion and possibly another part of the tips of the teeth may include a hard material coating resulting in an increase of wear resistance of the teeth.

The increased hardness of the teeth and of the tips of the teeth, respectively, compared to the tooth supporting body may be especially achieved by inserts being connected to protrusions at the tooth supporting body. These inserts result in increased hardness and wear resistance compared to the material of the protrusion and of the tooth supporting body. These inserts are designed as form bodies being produced as separate elements and then afterwards being permanently connected to the protrusions—especially by welding, soldering or brazing. However, the saw band could also be a bimetal saw band.

At least some of the teeth may have a rake angle of approximately 10° or more, especially approximately 12° or more, and/or a clearance angle of approximately 18° or more, especially approximately 20° or more. This results in the cutting wedge being slimmed and becoming more aggressive. The cutting forces are reduced and cold work hardening of the material to be cut is counteracted. Less chip deformation work has to be done due to the increased rake angle. Frictional forces in the cutting process are reduced due to the increased clearance angle.

In all above and below described embodiments of the saw band, the order, divisions, heights, widths, numbers of chamfers, chamfer angles, chamfer lengths, flank angles, horizontal cutting edge portions and so forth of the teeth may be varied.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if a chamfer is mentioned, this is to be understood such that there is exactly one chamfer or there are two chamfers or more chamfers. Additional features may be added to these features, or these features may be the only features of the respective product.

The reference signs contained in the claims are not limiting the extent of the matter protected by the claims. Their sole function is to make the claims easier to understand.

BRIEF DESCRIPTION OF THE DRAWINGS

In the following, the invention is further explained and described with respect to preferred exemplary embodiments illustrated in the drawings.

DETAILED DESCRIPTION

Referring now in greater detail to the drawings, FIGS. 1-4 illustrate different views of a first exemplary embodiment of the new saw band 1.

Figure 1:
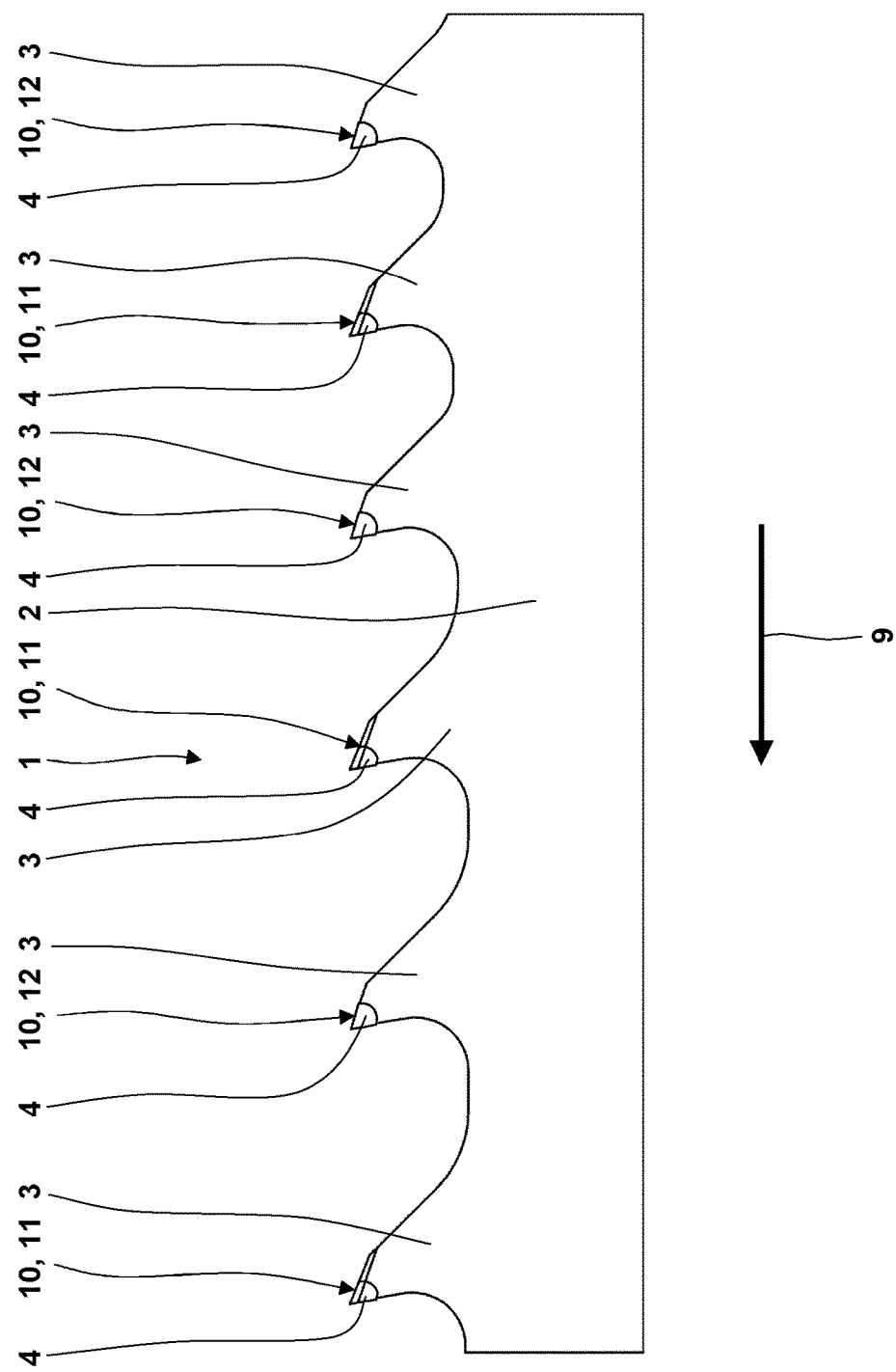
FIG. 1 illustrates a side view of a first exemplary embodiment of a new saw band.
Figure 2:
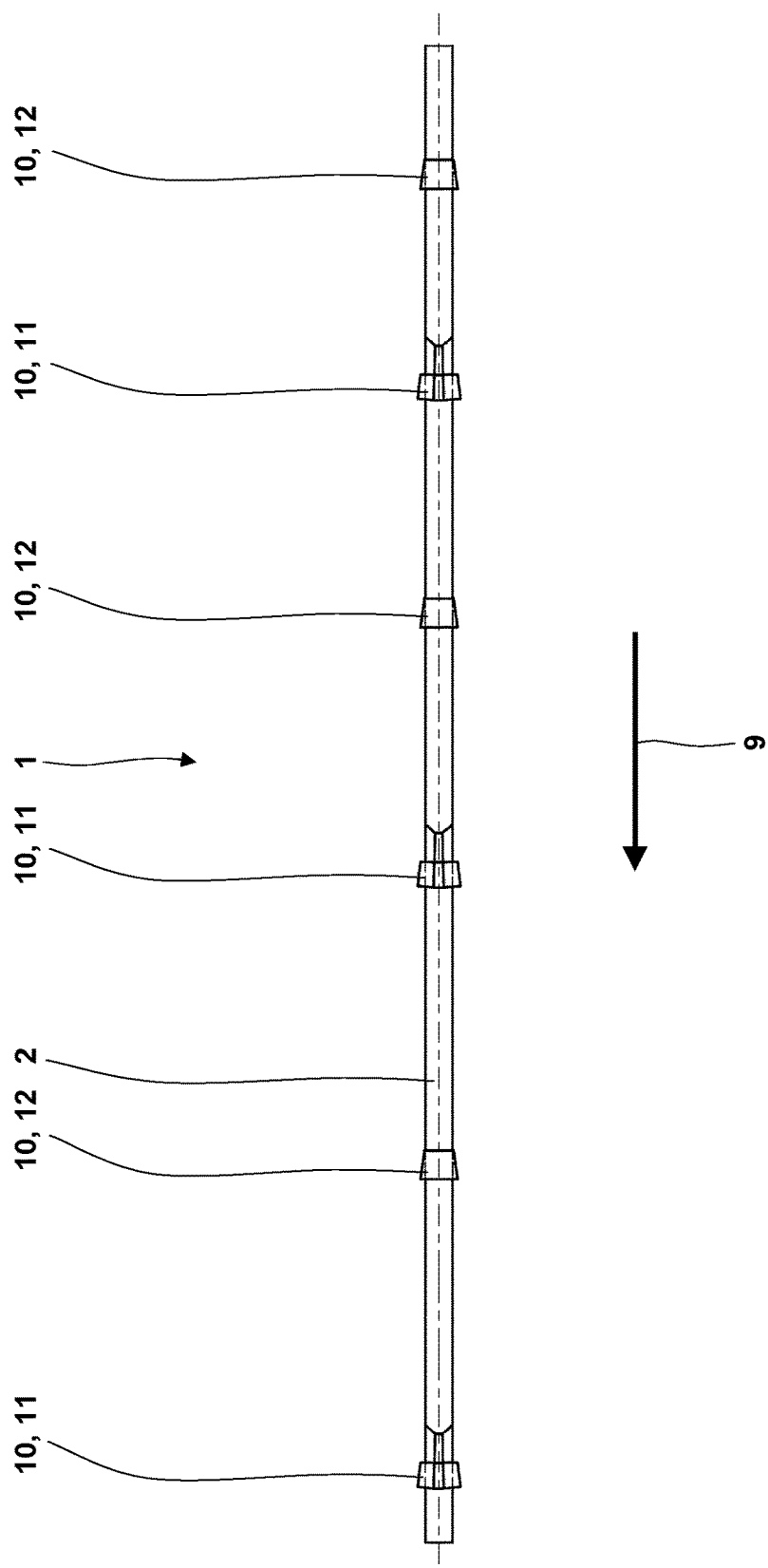
FIG. 2 illustrates the saw band according to FIG. 1 in a top view.

It is to be understood that the figures only illustrate a section of the saw band 1 which further extends to the left and to the right as well as further down as seen in the illustration of FIG. 1 and further to the left and to the right as seen in the illustration of FIG. 2. The vertical lines at the far left and at the far right in FIGS. 1 and 2 as well as the horizontal line above the arrow in FIG. 1 are only symbolic broken lines. The illustrations of FIGS. 1 and 2 are correctly scaled with a scale of 1:3.

The saw band 1 is designed as an elongated saw band having a direction of band movement 9. The saw band 1 itself is made of metal, and it serves to cut metal. However, it could also be made of different materials and/or serve to cut other materials.

The saw band 1 includes a tooth supporting body 2 of which only a section is visible. The tooth supporting body 2 includes a plurality of protrusions 3 at each of which an insert 4 is fixedly arranged. The protrusion 3 together with the insert 4 forms a tooth 10 having a cutting portion 5. The insert 4 is made of a material being harder than the material of the protrusions 3 and of the tooth supporting body 2 of the saw band 1. Preferably, the material of the insert 4 is hard metal. However, it could also be a different suitable material. The inserts 4 are connected to the respectively associated protrusion 3—especially by welding, soldering or brazing—in a fixed way. However, for example, the saw band 1 could also be designed as a bimetal saw band.

The saw band 1 includes two geometrically differently designed teeth 10 in the group. The teeth 10 are arranged in the group at a constant division. The group is repeated along the length of the saw band 1 with a constant division. However, it is also possible to use variable divisions.

Figure 3:
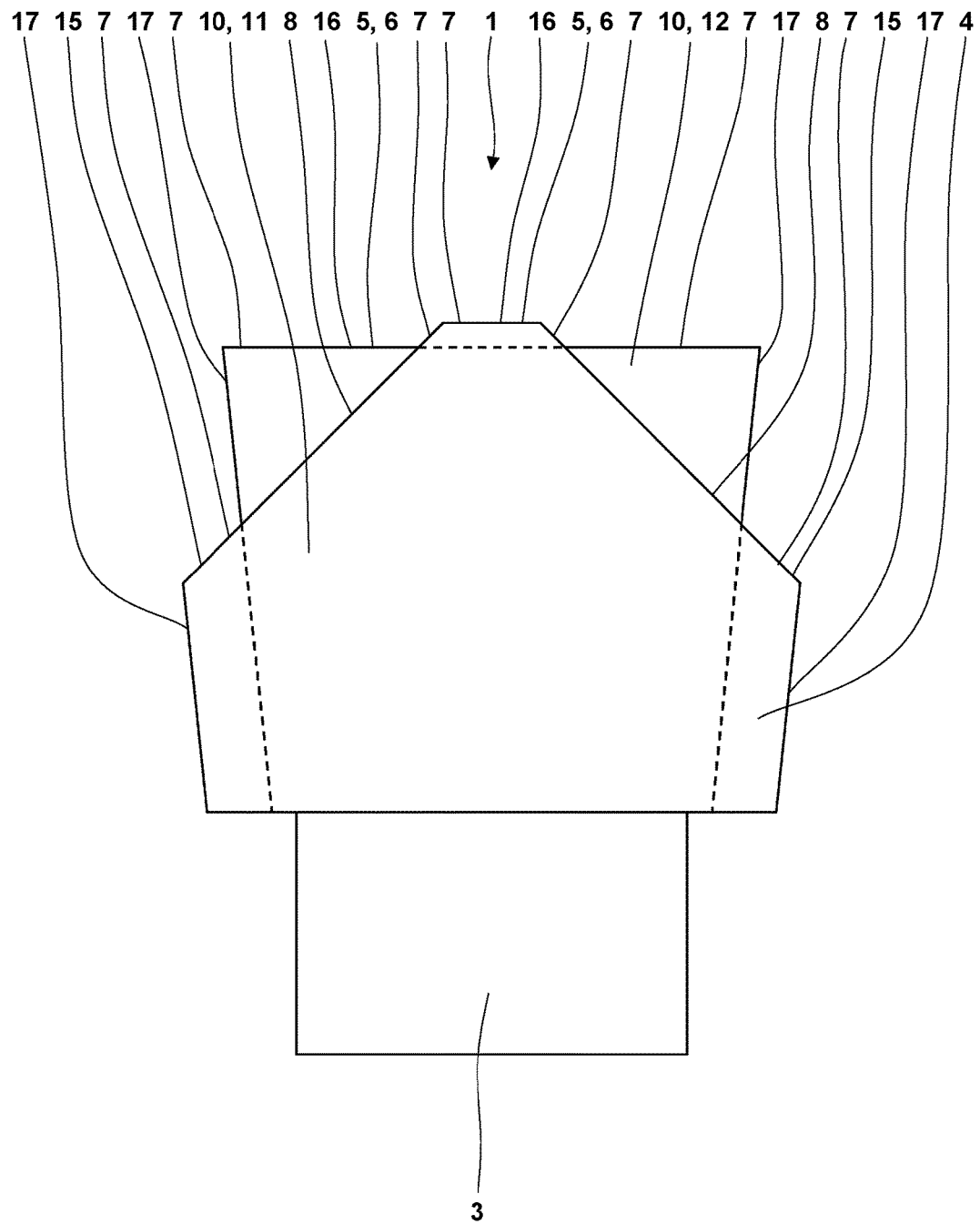
FIG. 3 illustrates the saw band according to FIG. 1 in a front view.
Figure 4:
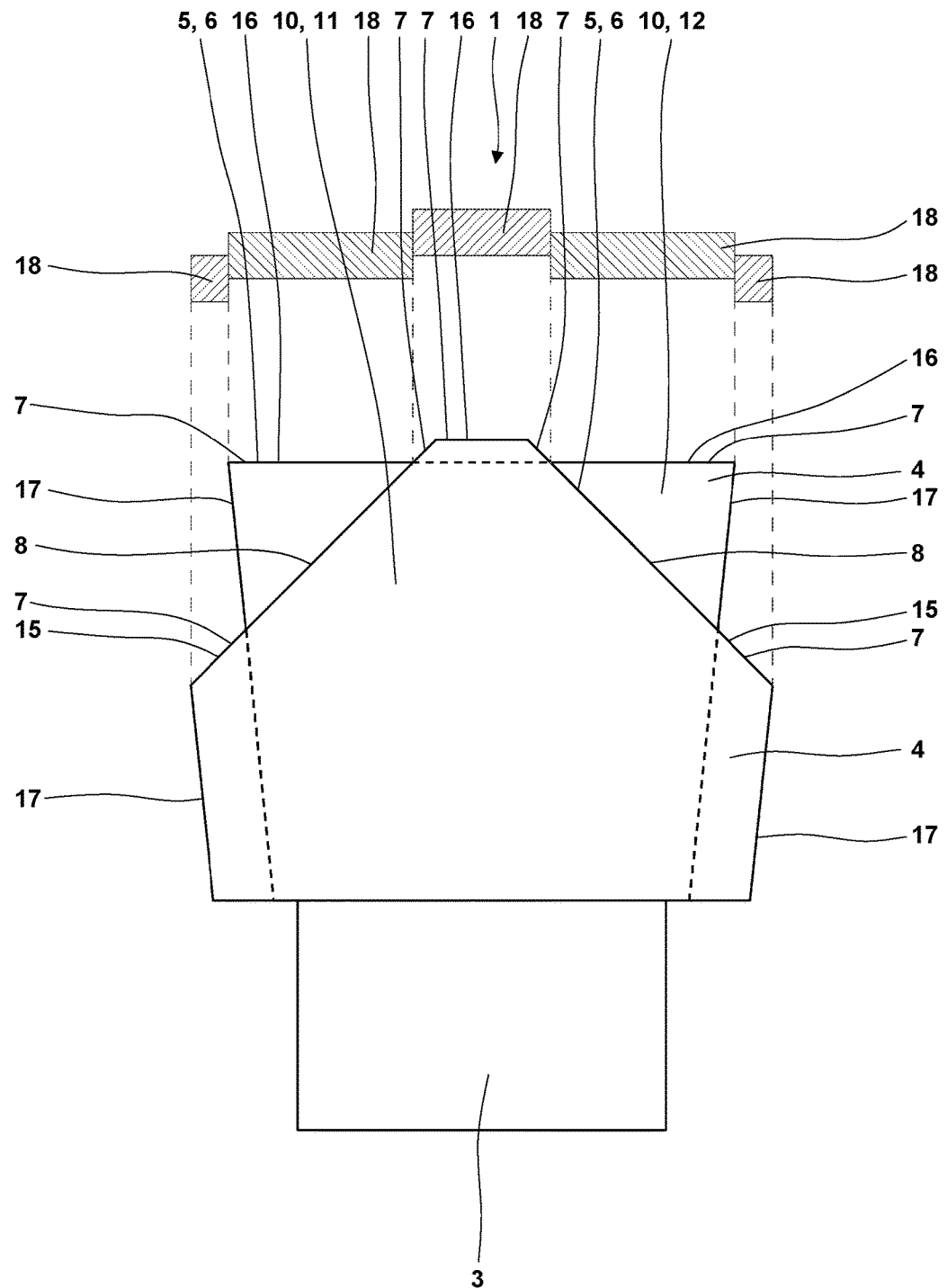
FIG. 4 illustrates the saw band according to FIG. 1 in a front view illustrating the cutting channel portions.

The new design of the teeth 10 of the saw band 1 is to be particularly seen well in FIGS. 3 and 4. These figures each show the front view of the saw band 1. This front view corresponds to the projection of the saw band 1 against the direction of band movement 9. In this view, the teeth 10 overlap such that only a few teeth 10—in this example only two teeth 10—are visible. It is to be understood that additional teeth 10 are arranged in front of and behind these teeth 10 as it is to be seen in FIGS. 1 and 2.

The teeth 10 each include a cutting portion 5 of which only the cutting edge 6 is visible in the views of FIGS. 3 and 4. The cutting edges 6 in turn include different portions. Such a portion is designated as effective cutting edge portion 7 if it contacts the material to be cut during sawing. If this is not the case since the respective portion is covered by a portion of another tooth 10 in the projection, this is an ineffective cutting edge portion 8.

In the illustrated example, the saw band 1 includes two geometrically differently designed teeth 10 in the group.

The first tooth 11 is a chamfered tooth 10 including two chamfers 15 forming a part of the cutting edge 6 and being connected to a straight portion 16 of the cutting edge 6 in a symmetrical way. In the present case, the chamfer angle is approximately 45°. However, the chamfers 15 could also have a different angle, for example approximately between 50° and 20°, especially approximately 30°. Flanks 17 are each connected to the chamfers 15 as seen in a direction further down. In the exemplary embodiment, the flanks 17 have a flank angle of approximately 6°. However, the could also have a different flank angle, for example approximately between 2° and 8°, especially approximately 3°. The first tooth 11 is designed as a combined performance and surface tooth and as a positively conical tooth.

The group of teeth furthermore includes a second tooth 12. In this case, the second tooth 12 is designed not the be chamfered such that its flank 17 is directly connected to the straight portion 16 of the cutting edge 6. In this case, the flank angle is also approximately 6°. However, a different flank angle could be chosen. The second tooth 12 is designed as a performance tooth, a positively conical tooth and a chip separator tooth.

The cutting work performed due to the cooperation of the first tooth 11 and the second tooth 12 is to be particularly well seen in FIG. 4 by means of the cutting channel portions 18 being illustrated in its upper portion. Five cutting channel portions 18 are formed by the only two geometrically differently designed teeth 11 and 12. This new tooth geometry and arrangement may also be designated as "quintuple chip" geometry. It is realized by the second tooth 12 being designed as a chip separator tooth.

This e.g. means that the tooth 12 covers a part of the cutting edge 6 of the first tooth 11 such that this includes two effective cutting edge portions 7 each in the region of one of its chamfers 15 and that an ineffective cutting edge portion 8 of the first tooth 11 is formed therebetween. The ineffective cutting edge portion 8 being arranged therebetween is the portion being covered by the second tooth 12. This intermediate arrangement of the ineffective cutting edge portion 8 thus results from the fact that the overlap as seen from the longitudinal center plane towards the outside ends before reaching the outermost point of the cutting edge 6 of the first tooth 11.

As it is to be seen well in FIG. 4, due to this, there are no sharp edges in the outer portions of the two second outermost cutting channel portions 18 in the sense of a transition between the straight portion 16 and a chamfer 15 of the second tooth 12. Instead, there only is a continuous straight portion 16. In this way, the surface quality in this cutting channel portion 18 is improved.

In the present example according to FIGS. 3 and 4, the first tooth 11 is designed such that it has a greater maximum height and a greater maximum width than the second tooth 12. The first tooth 11 thus is a combined performance end surface tooth. The second tooth 12 is a pure performance tooth, and it does not participate in forming the lateral surface in the cutting channel. The second tooth 12 is designed and arranged such that its flank 17 intersects the chamfer 7 of the first tooth 11 and does not cover and overlap the flank 17 of the first tooth 11.

Due to the positive flank angle, there is an undercut and a free-cut or clearance angle, respectively. This results in less friction occurring and the chips being produced side by side being better separated from one another. This results in less vibrations and thus reduced noise emission during sawing. However, it is also possible to choose a negative flank angle or a flank angle of 0°. In these cases, there is no undercut.

The width of the separate cutting channel portions 18 corresponds to the width of the respective chip being removed during sawing. In the present case, there are five separate chips having different widths. However, all of the chips or some of the chips could have the same width.

Figure 5:
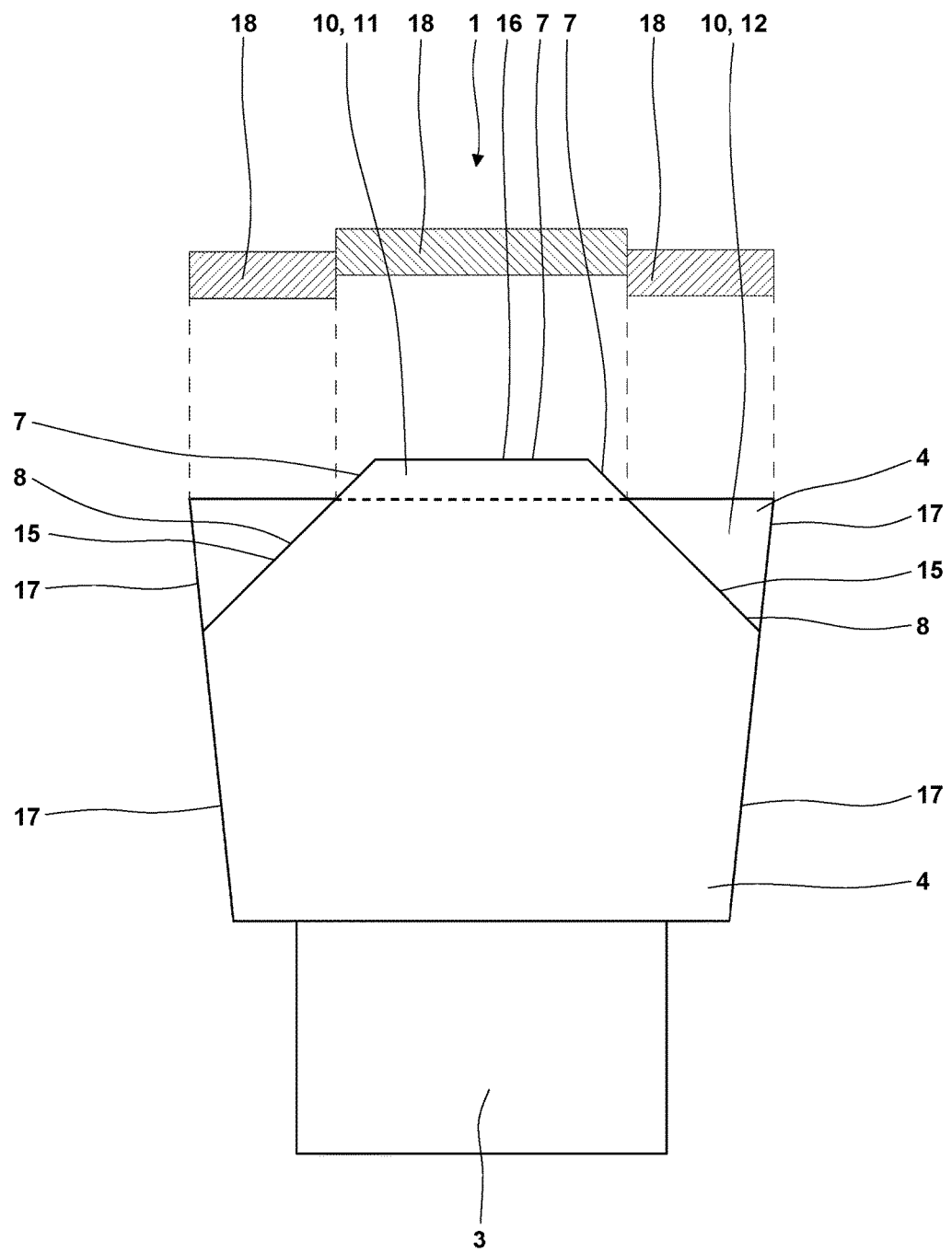
FIG. 5 illustrates a saw band of the prior art according to the pre-cutter and finishing cutter technology in a front view illustrating the cutting channel portions.

For emphasizing the difference between the saw band 1 according to the invention and the saw band 1 of the prior art, such a saw band 1 of the prior art is illustrated in FIG. 5. This is a saw band 1 according to the pre-cutter and finishing cutter technology. Two geometrically differently designed teeth 10, namely the first tooth 11 and the second tooth 12 are alternatingly arranged at the saw band 1. The first tooth 11 is the so-called pre-cutter. The second tooth 12 is the so-called finishing cutter. The first tooth 11 is higher than the second tooth 12, and it is chamfered. The second tooth 12 is designed not to be chamfered. The flanks 17 of the second tooth 12 intersect the flanks 17 of the first tooth 11. In this way, three cutting channel portions 18 are produced by the two different teeth 10.

Figure 6:
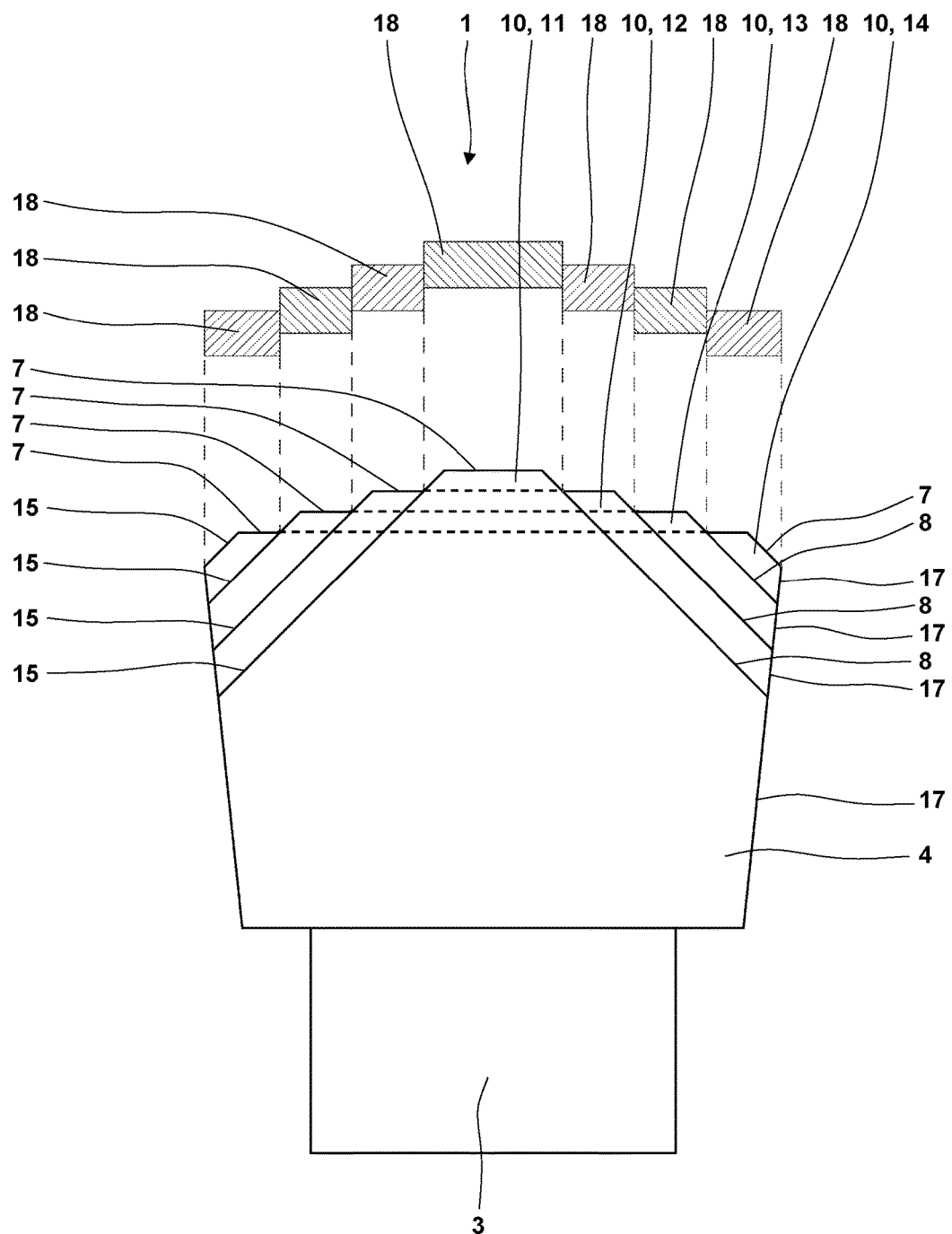
FIG. 6 illustrates a saw band of the prior art according to the group technology in a front view illustrating the cutting channel portions.

Another saw band 1 of the prior art is illustrated in FIG. 6. This saw band 1 is a saw band 1 according to the group technology, and more particularly one under the trademark "FUTURA" by the applicant. The repeating group of teeth includes the first tooth 11, the second tooth 12, the third tooth 13 and the fourth tooth 14. All teeth 14 are designed to be chamfered and designed and arranged such that their flanks 17 overlap. The teeth 10 are designed and arranged in a heights and widths graduation such that seven cutting channel portions 18 are produced by four teeth 10.

Compared to the prior art according to FIGS. 5 and 6, a comparatively great number of separate cutting channel portions 18 is produced by the new saw band 1 including at least one chip separator tooth and a comparatively small number of geometrically differently designed teeth 10.

FIGS. 7-24 illustrate different additional exemplary embodiments of the new saw band 1. With the exception of the specific geometry of the teeth 10, the design of the saw band 1 substantially corresponds to the one of the first embodiment of the saw band 1 such that it is referred to FIGS. 1 and 2 with respect to the side view and the top view. The group of teeth is repeated along the length of the saw band 1 at a constant division. However, it would also be possible to use a variable division.

Figure 7:
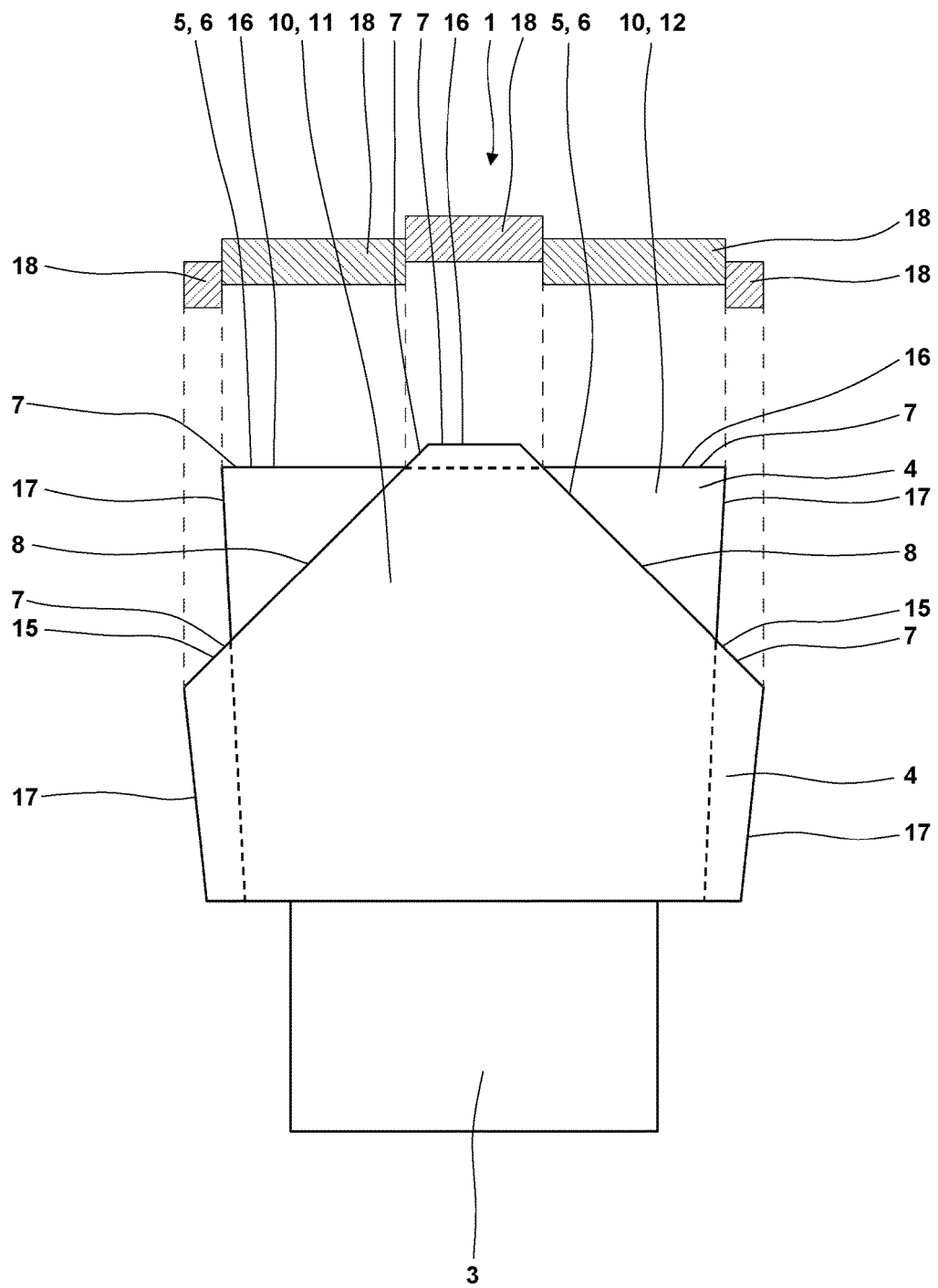
FIG. 7 illustrates a second exemplary embodiment of the new saw band in a front view illustrating the cutting channel portions.

FIG. 7 illustrates a view corresponding to FIG. 4 of a second exemplary embodiment of the new saw band 1. The saw band 1 includes two geometrically differently designed teeth 10 in the group. The first tooth 11 is designed to be identical to the one of the first exemplary embodiment of the saw band 1. The first tooth 11 is designed as a combined performance and surface tooth and as a positively conical tooth. In contrast to the first exemplary embodiment of the saw band 1, the second tooth 12 does not have a flank angle of approximately 6°, but instead of approximately 3°. In this way, five cutting channel portions 18 are produced by two geometrically differently designed teeth 10.

Figure 8:
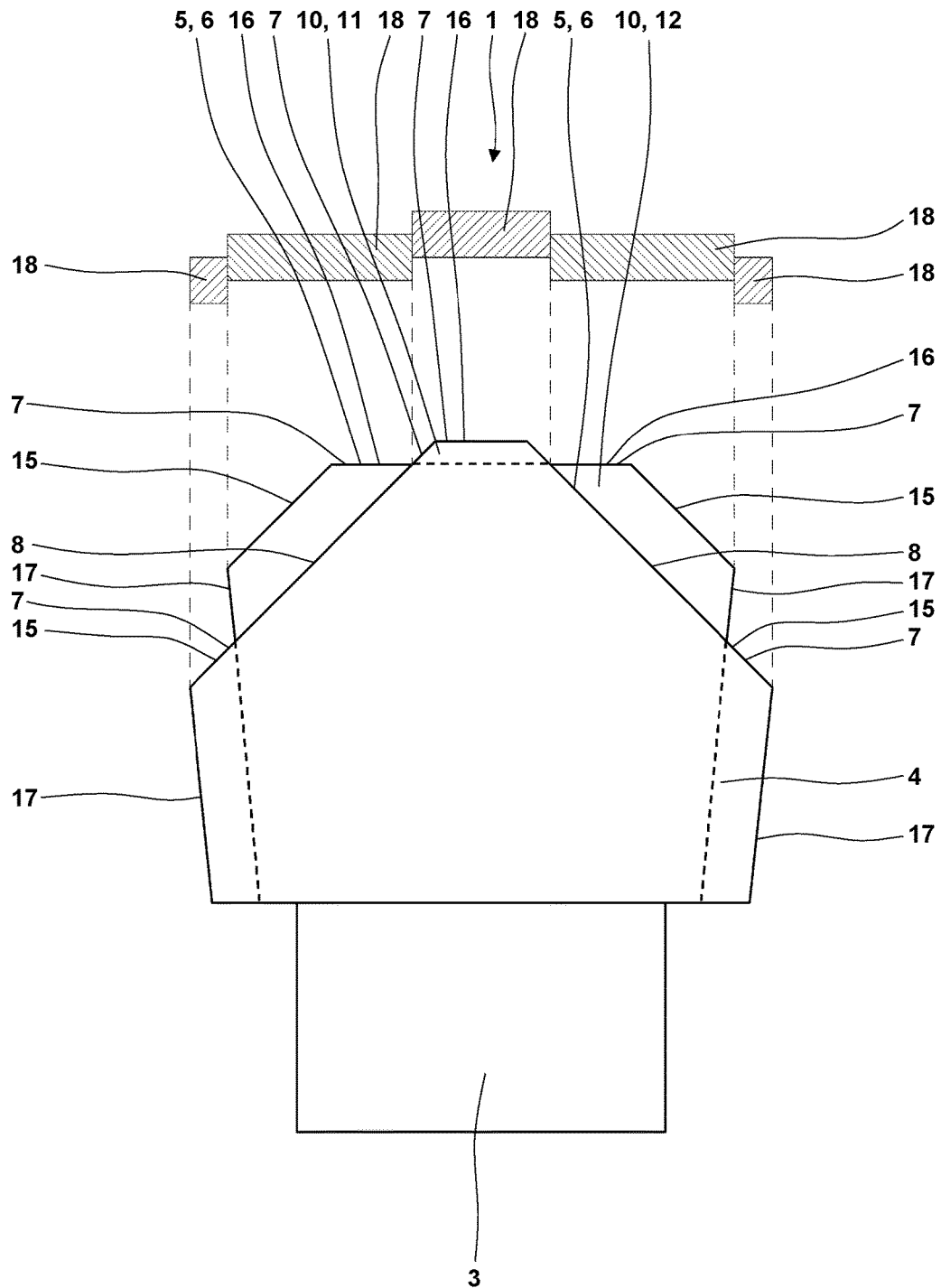
FIG. 8 illustrates a third exemplary embodiment of the new saw band in a front view illustrating the cutting channel portions.

FIG. 8 illustrates a view corresponding to FIG. 4 of another exemplary embodiment of the new saw band 1. The saw band 1 includes two geometrically differently designed teeth 10 in the group. The first tooth 11 is designed to be identical to the one of the first exemplary embodiment of the saw band 1. The first tooth 11 is designed as a combined performance and surface tooth and as a positively conical tooth. In contrast to the first exemplary embodiment of the saw band 1, the second tooth 12 includes chamfers 15. In this way, five cutting channel portions 18 are produced by two geometrically differently designed teeth 10.

Figure 9:
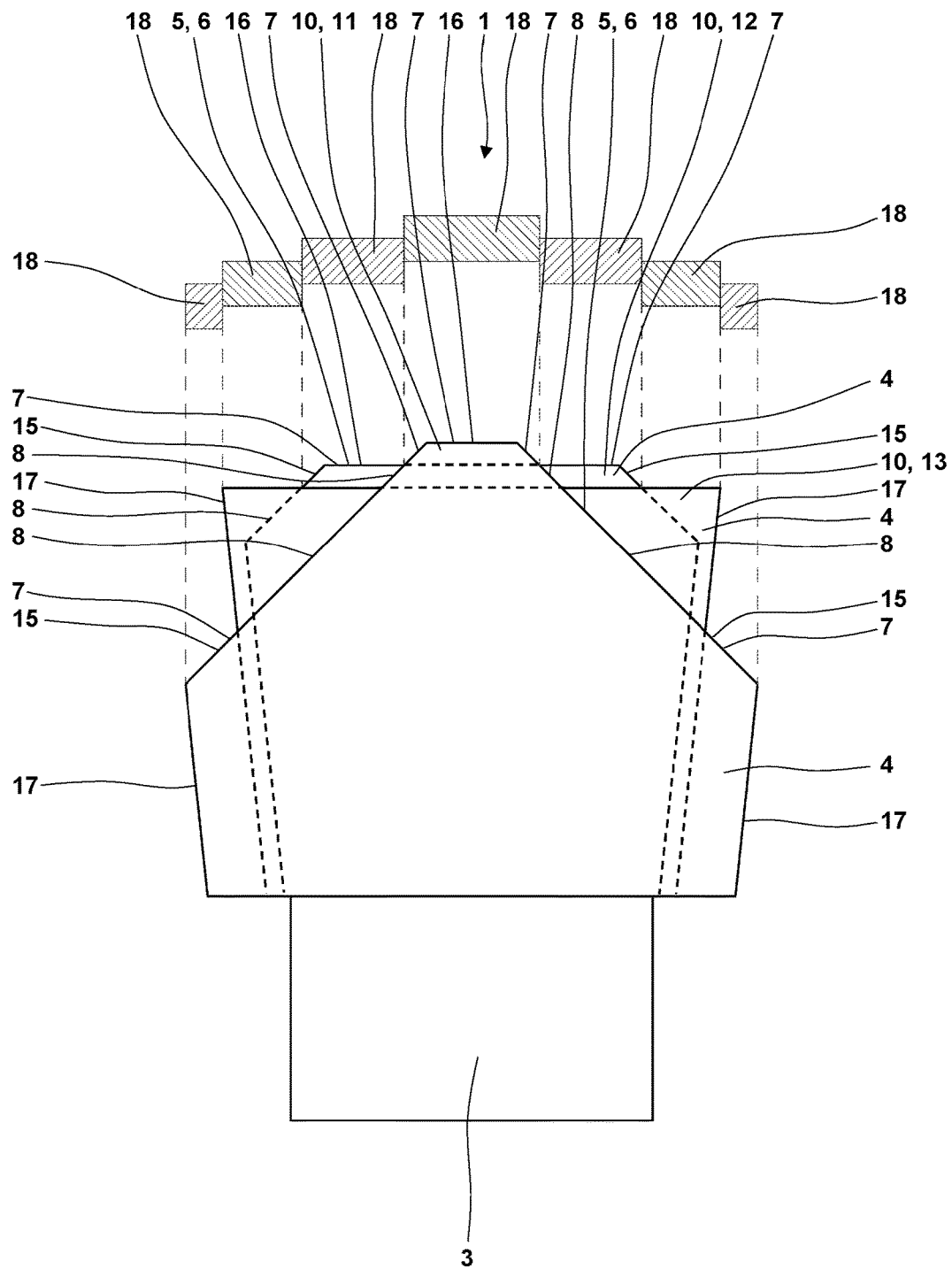
FIG. 9 illustrates a fourth exemplary embodiment of the new saw band in a front view illustrating the cutting channel portions.

FIG. 9 illustrates a view corresponding to FIG. 4 of another exemplary embodiment of the new saw band 1. The saw band 1 includes three geometrically differently designed teeth 10 in the group. The first tooth 11 once again is designed in the same way as in the first exemplary embodiment of the saw band 1. The first tooth 11 is designed as a combined performance and surface tooth and as a positively conical tooth. The second tooth 12 once again has a flank angle of approximately 6°, but a slightly smaller height than in the first exemplary embodiment of the saw band 1. In this way, room is created for the third tooth 13. In this case, it is designed to be chamfered and to be the second highest tooth 10 in the group of teeth. The third tooth 13 is designed as a performance tooth and as a positively conical tooth. The teeth 12 and 13 both functionally commonly form a chip separator tooth. In this way, seven cutting channel portions 18 are produced by three geometrically designed teeth 10. This is the same number of cutting channel portions 18 as it is realized in the prior art according to FIG. 6 with four geometrically differently designed teeth 10.

Figure 10:
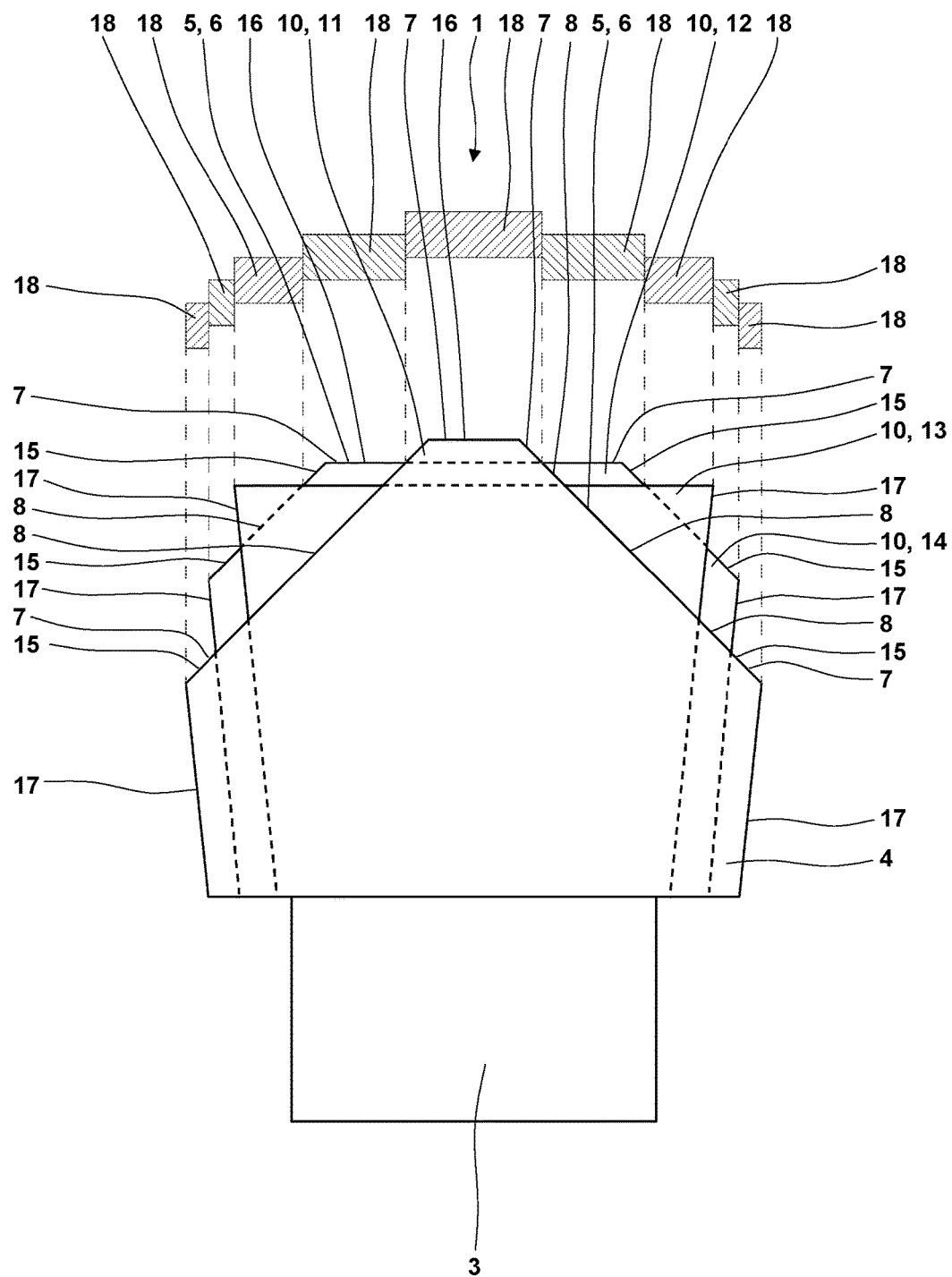
FIG. 10 illustrates a fifth exemplary embodiment of the new saw band in a front view illustrating the cutting channel portions.

FIG. 10 illustrates a view corresponding to FIG. 4 of another exemplary embodiment of the new saw band 1. The saw band 1 includes three geometrically differently designed teeth 10 in the group. The first tooth 11 once again is designed in the same way as in the first exemplary embodiment of the saw band 1. The first tooth 11 is designed as a combined performance and surface tooth and as a positively conical tooth. All three teeth 11, 12 and 13 include a flank angle of approximately 6°. The first tooth 11 and the second tooth 12 are designed to be chamfered. The third tooth 13 is designed not to be chamfered. The teeth 10 are designed and arranged such that there are two chip separator teeth, namely the second tooth 12 and the third tooth 13. The second tooth 12 is a chip separator tooth for the first tooth 11. The third tooth 13 is a chip separator tooth for the second tooth 12. At the same time, the teeth 12 and 13 are each designed as a performance tooth and as a positively conical tooth. In this way, nine cutting channel portions 18 are produced with three geometrically differently designed teeth 10. This is a greater number of cutting channel portions 18 as it is realized in the prior art according to FIG. 6 with four geometrically differently designed teeth 10.

Figure 11:
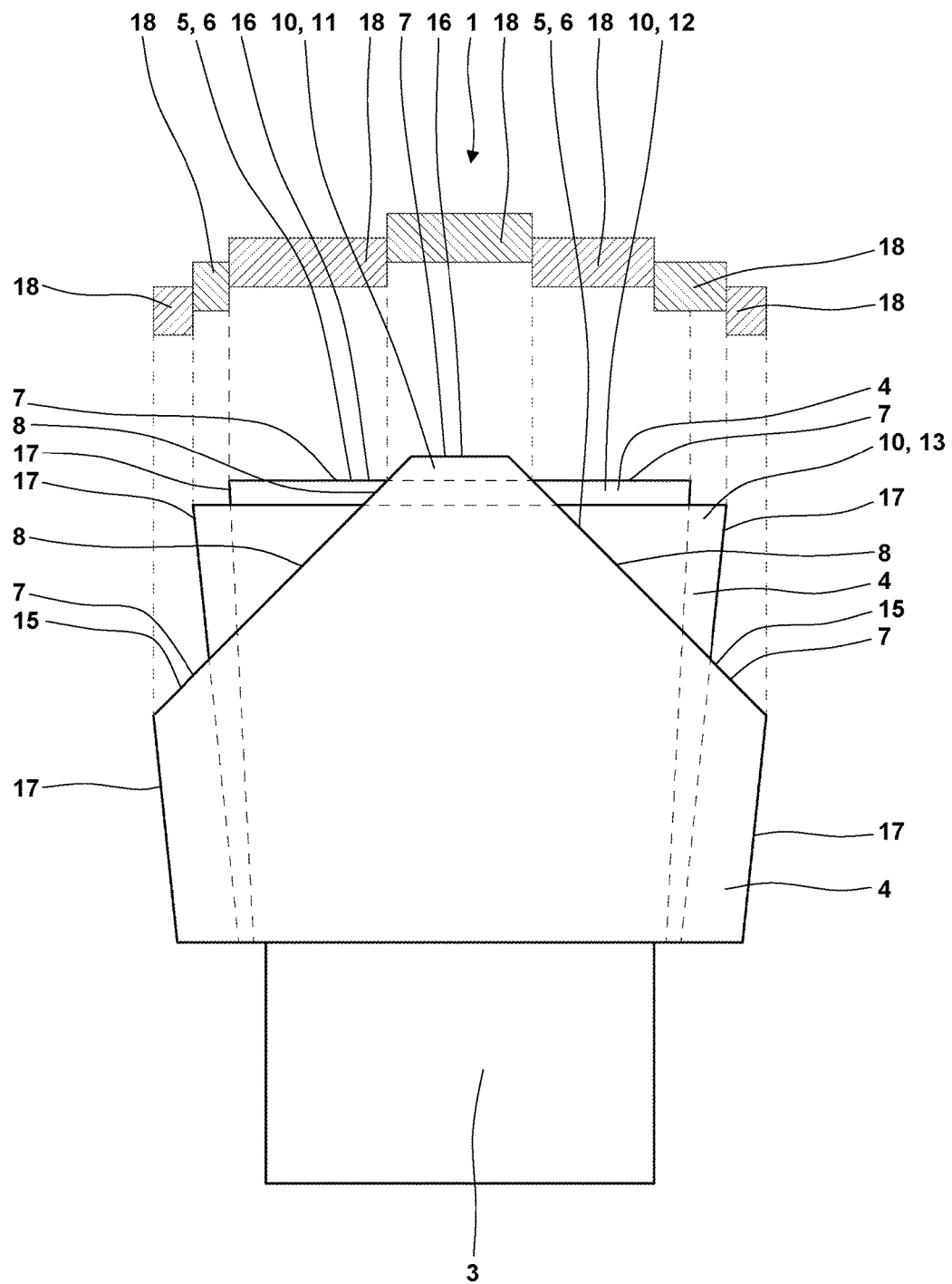
FIG. 11 illustrates a sixth exemplary embodiment of the new saw band in a front view illustrating the cutting channel portions.

FIG. 11 illustrates a view corresponding to FIG. 4 of another exemplary embodiment of the new saw band 1. The saw band 1 includes three geometrically differently designed teeth 10 in the group. The first tooth 11 once again is designed in the same way as in the first exemplary embodiment of the saw band 1. The first tooth 11 is designed as a combined performance and surface tooth and as a positively conical tooth. The teeth 11 and 13 have a flank angle of approximately 6°. The second tooth 12 has a flank angle of approximately 3.5°. The second tooth 12 and the third tooth 13 are designed not to be chamfered. The teeth 12 and 13 are each designed as a performance tooth and as a positively conical tooth. The teeth 12 and 13 functionally commonly form a chip separator tooth. In this way, seven cutting channel portions 18 are produced with three geometrically differently designed teeth 10. This is the same number of cutting channel portions 18 as it is realized in the prior art according to FIG. 6 with four geometrically differently designed teeth 10.

Figure 12:
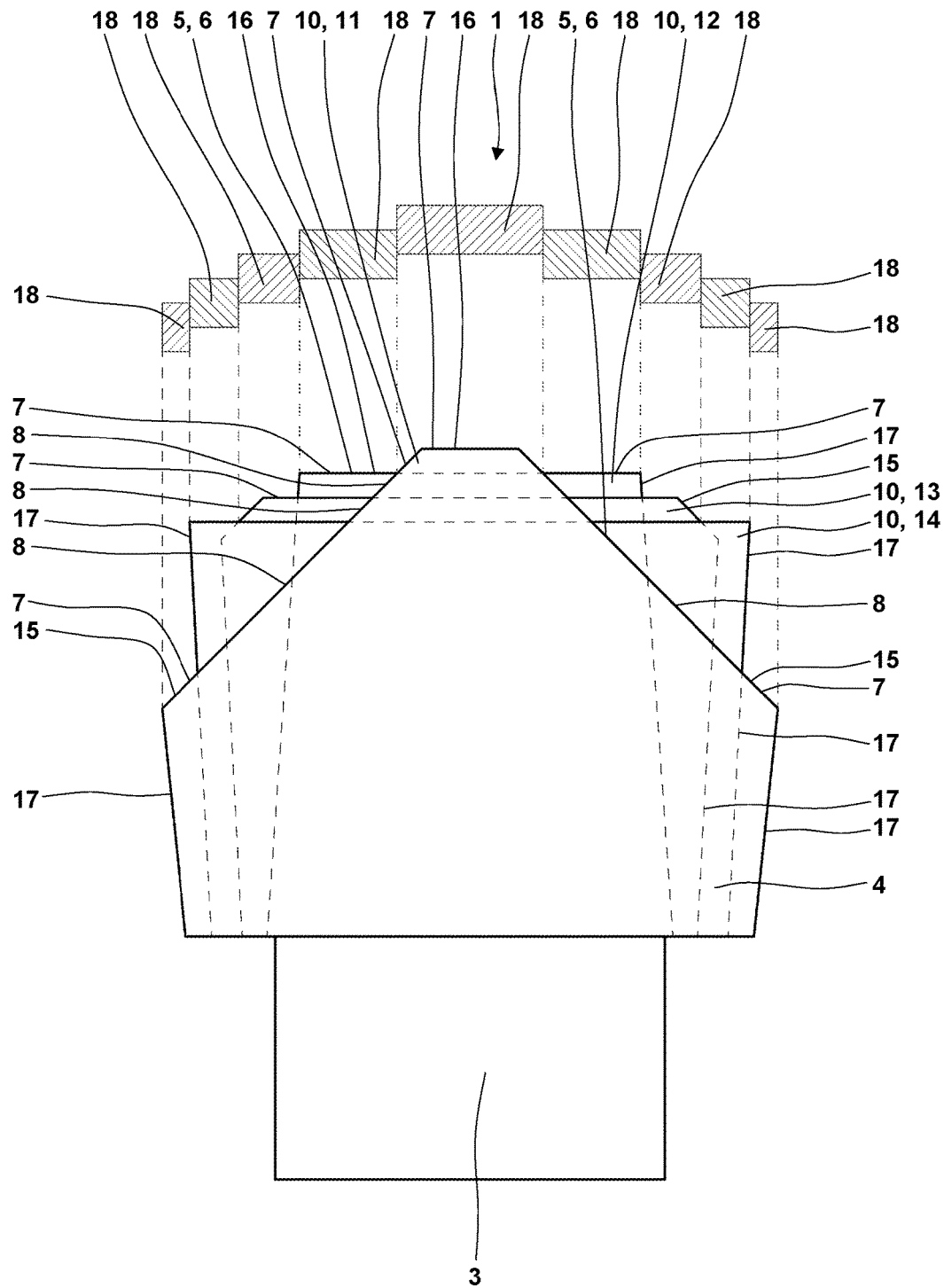
FIG. 12 illustrates a seventh exemplary embodiment of the new saw band in a front view illustrating the cutting channel portions.

FIG. 12 illustrates a view corresponding to FIG. 4 of another exemplary embodiment of the new saw band 1. The saw band 1 includes four geometrically differently designed teeth 10 in the group. The first tooth 11 once again is designed in the same way as in the first exemplary embodiment of the saw band 1. The first tooth 11 is designed as a combined performance and surface tooth and as a positively conical tooth. The first tooth 11 has a flank angle of approximately 6°. The second tooth 12 has a flank angle of approximately −4°. The teeth 13 and 14 each have a flank angle of approximately 3°. The first tooth 11 and the third tooth 13 are designed to be chamfered, and they have a chamfer angle of approximately 45°. The second tooth 12 and the fourth tooth 14 are not chamfered. The teeth 13 and 14 are each designed as a performance tooth and as a positively conical tooth. The tooth 12 is designed as a performance tooth and as a negatively conical tooth. The teeth 12, 13 and 14 functionally commonly form a chip separator tooth. In this way, nine cutting channel portions 18 are produced by four geometrically differently designed teeth 10. This is a greater number of cutting channel portions 18 than in the prior art according to FIG. 6 with four geometrically differently designed teeth 10.

Figure 13:
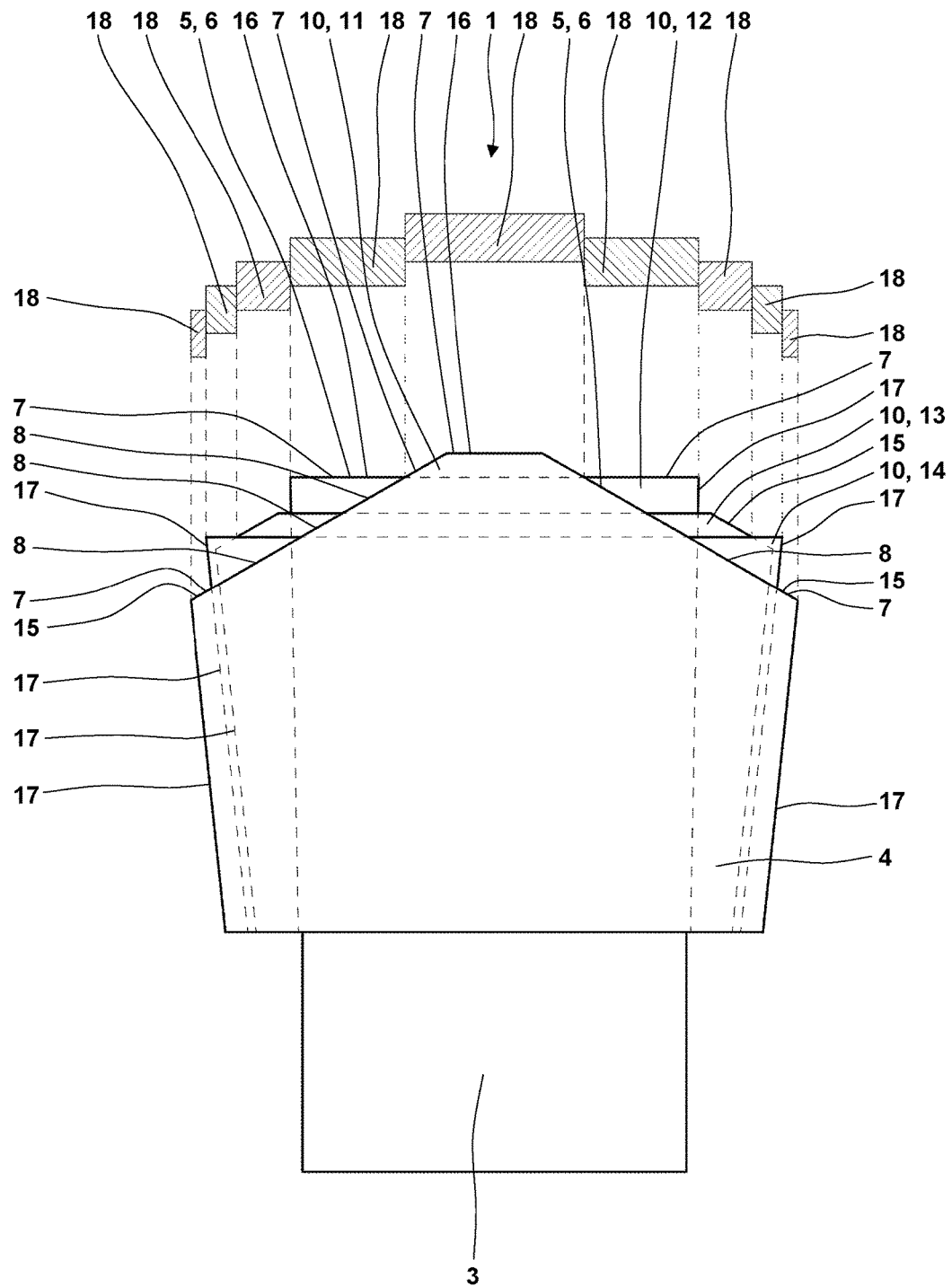
FIG. 13 illustrates an eighth exemplary embodiment of the new saw band in a front view illustrating the cutting channel portions.

FIG. 13 illustrates a view corresponding to FIG. 4 of another exemplary embodiment of the new saw band 1. The saw band 1 includes four geometrically differently designed teeth 10 in the group. The first tooth 11 is designed to be similar to the one of the first exemplary embodiment of the saw band 1, but it has a chamfer angle of approximately 30°. The teeth 11, 13 and 14 each have a flank angle of approximately 6°. The second tooth 12 has a flank angle of approximately 0°. The first tooth 11 and the third tooth 13 are designed to be chamfered, and they have a chamfer angle of approximately 30°. The second tooth 12 and the fourth tooth 14 are not chamfered. The teeth 13 and 14 are each designed as a performance tooth and as a positively conical tooth. The tooth 12 is designed as a performance tooth and as a straight (non-conical) tooth. The teeth 12, 13 and 14 functionally commonly form a chip separator tooth. In this way, nine cutting channel portions 18 are produced by four geometrically differently designed teeth 10.

Figure 14:
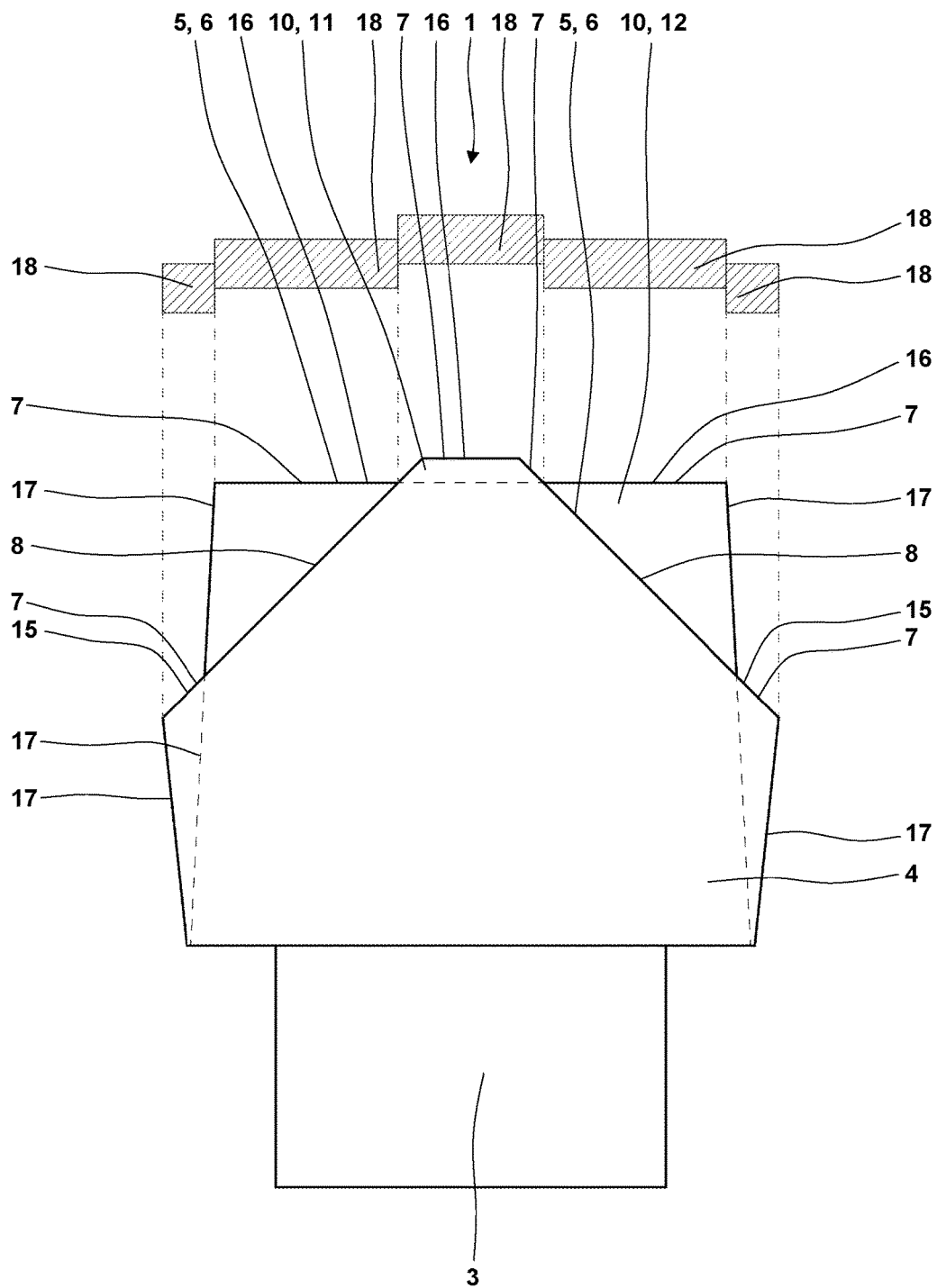
FIG. 14 illustrates a ninth exemplary embodiment of the new saw band in a front view illustrating the cutting channel portions.

FIG. 14 illustrates a view corresponding to FIG. 4 of another exemplary embodiment of the new saw band 1. The saw band 1 includes two geometrically differently designed teeth 10 in the group. The first tooth 11 is designed to be identical to the one of the first exemplary embodiment of the saw band 1. The first tooth 11 is designed as a combined performance and surface tooth and as a positively conical tooth. The second tooth 12 is designed to the be chamfered, and it has a negative flank angle. In this case, the flank angle is approximately −3.5°. The second tooth 12 is designed as a performance tooth, a negatively conical tooth and a chip separator tooth. In this way, five cutting channel portions 18 are produced by two geometrically differently designed teeth 10.

Figure 15:
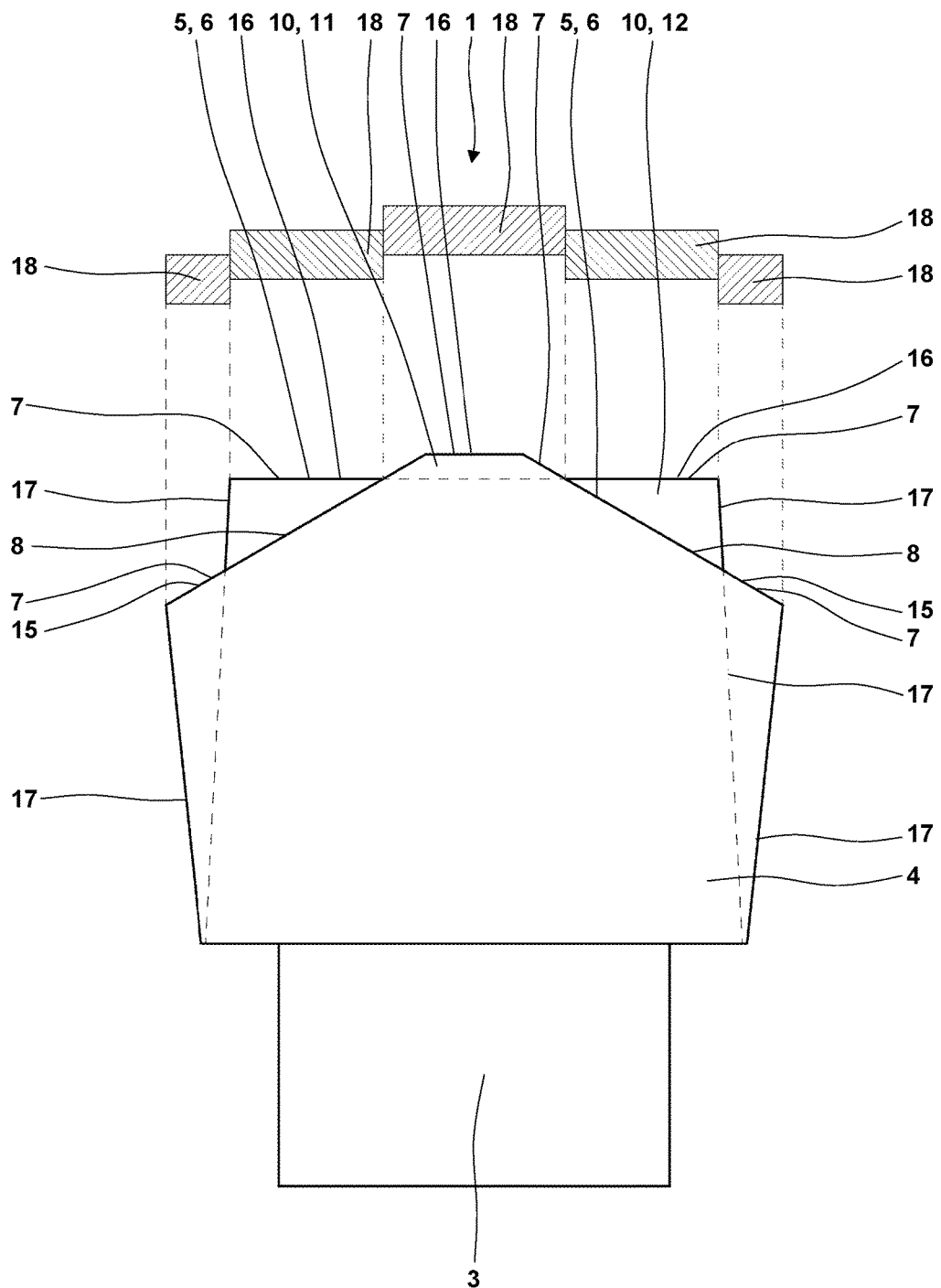
FIG. 15 illustrates a tenth exemplary embodiment of the new saw band in a front view illustrating the cutting channel portions.

FIG. 15 illustrates a view corresponding to FIG. 4 of another exemplary embodiment of the new saw band 1. The saw band 1 includes two geometrically differently designed teeth 10 in the group. The first tooth 11 is designed to be similar to the one of the first exemplary embodiment of the saw band 1, but it has a chamfer angle of approximately 30°. The first tooth 11 is designed as a combined performance and surface tooth and as a positively conical tooth. The second tooth 12 has a negative flank angle. In the present case, this angle is approximately −3°. The second tooth 12 is designed as a performance tooth, a negatively conical tooth and a chip separator tooth. In this way, five cutting channel portions 18 are produced by two geometrically differently designed teeth 10.

Figure 16:
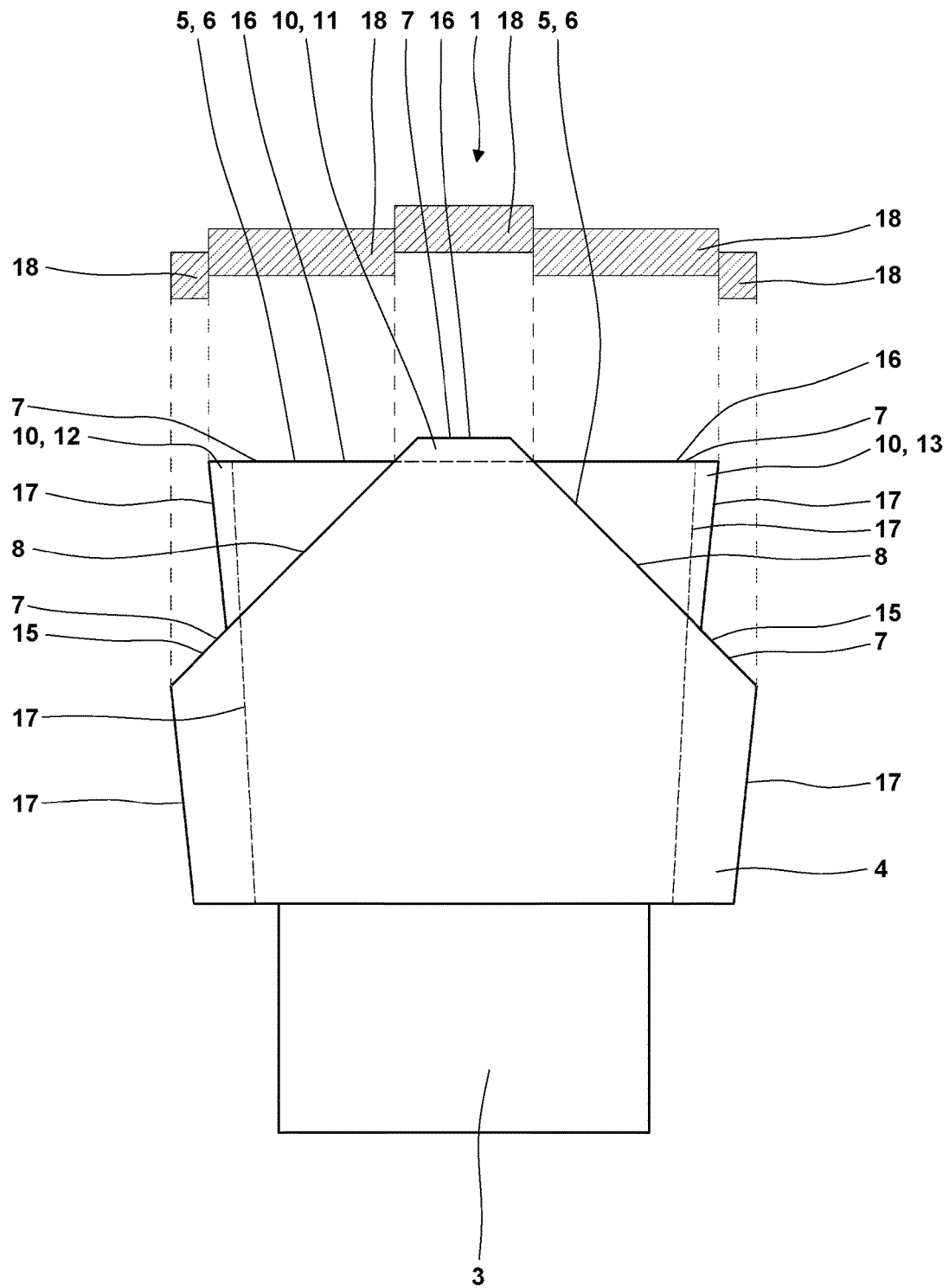
FIG. 16 illustrates an eleventh exemplary embodiment of the new saw band in a front view illustrating the cutting channel portions.

FIG. 16 illustrates a view corresponding to FIG. 4 of another exemplary embodiment of the new saw band 1. The saw band 1 includes three geometrically differently designed teeth 10 in the group. The first tooth 11 once again is designed in the same way as in the first exemplary embodiment of the saw band 1. The first tooth 11 is designed as a combined performance and surface tooth and as a positively conical tooth. The second tooth 12 and the third tooth 13 have the same height. They are designed to be asymmetrical. The second tooth 12 extends further towards the left from the longitudinal center plane. The third tooth 13 extends further towards the right from the longitudinal center plane. In this way, the right flank 17 of the second tooth 12 is covered by the third tooth 13. The left flank 17 of the third tooth 13 is covered by the second tooth 12. The teeth 12, 13 are designed to be functionally similar to set teeth. However, the asymmetry has not been realized by subsequent setting, but instead by a respective design of the inserts 4. The teeth 12 and 13 are each designed as a performance tooth and as a positively conical tooth having a flank angle of approximately 3°. The teeth 12 and 13 functionally commonly form a chip separator tooth. In this way, five cutting channel portions 18 are produced by three geometrically differently designed teeth 10.

Figure 17:
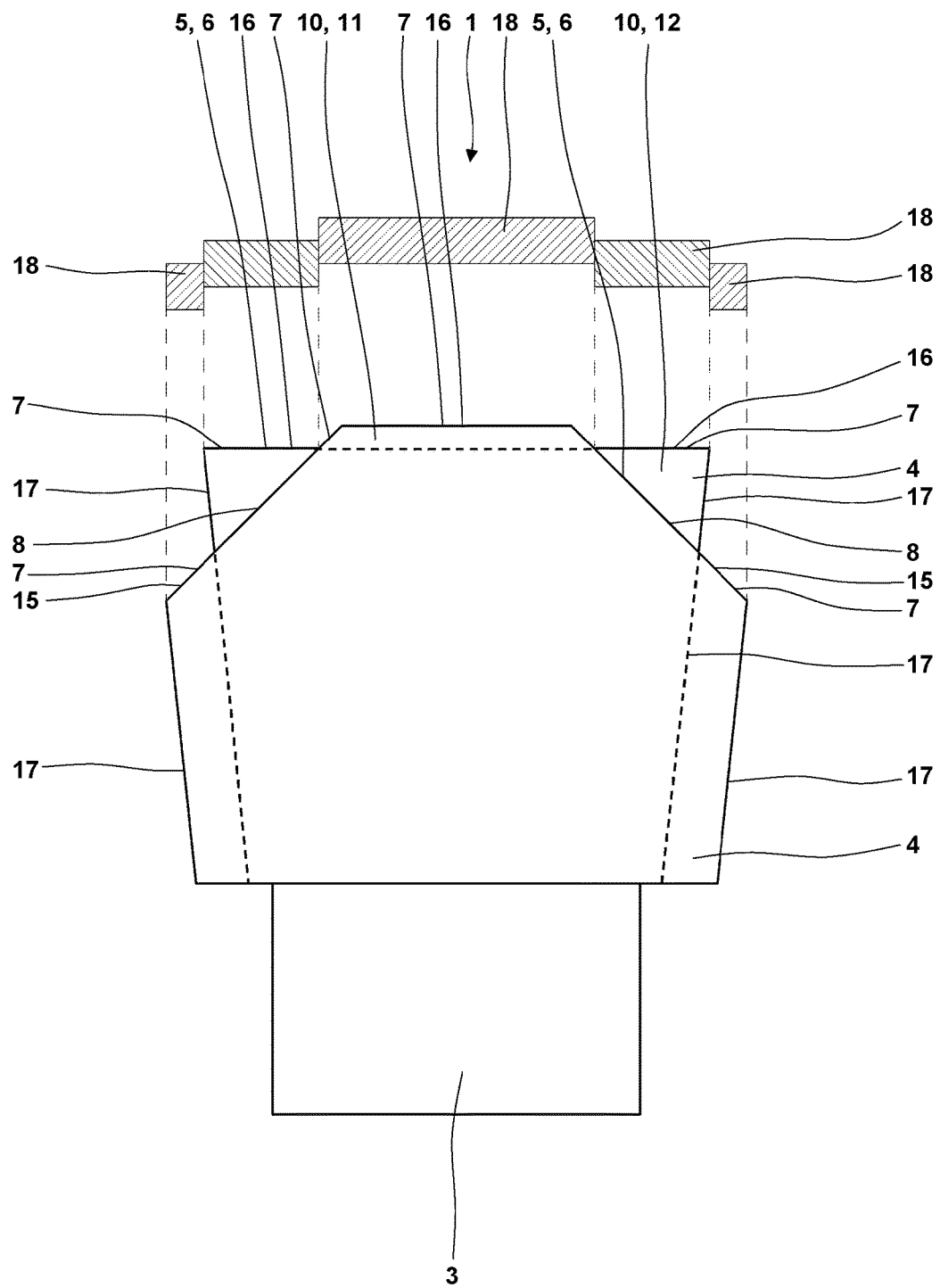
FIG. 17 illustrates a twelfth exemplary embodiment of the new saw band in a front view illustrating the cutting channel portions.

FIG. 17 illustrates a view corresponding to FIG. 4 of another exemplary embodiment of the new saw band 1. The saw band 1 includes two geometrically differently designed teeth 10 in the group. The first tooth 11 once again is designed to be similar to the one of the first exemplary embodiment of the saw band 1, but it has a longer straight portion 16. The first tooth 11 is designed as a combined performance and surface tooth and as a positively conical tooth. The second tooth 12 is designed not to be chamfered. Both teeth 11, 12 have a flank angle of approximately 6°. The second tooth 12 is designed as a performance tooth, a positively conical tooth and a chip separator tooth. In this way, five cutting channel portions 18 are produced by two geometrically differently designed teeth 10.

Figure 18:
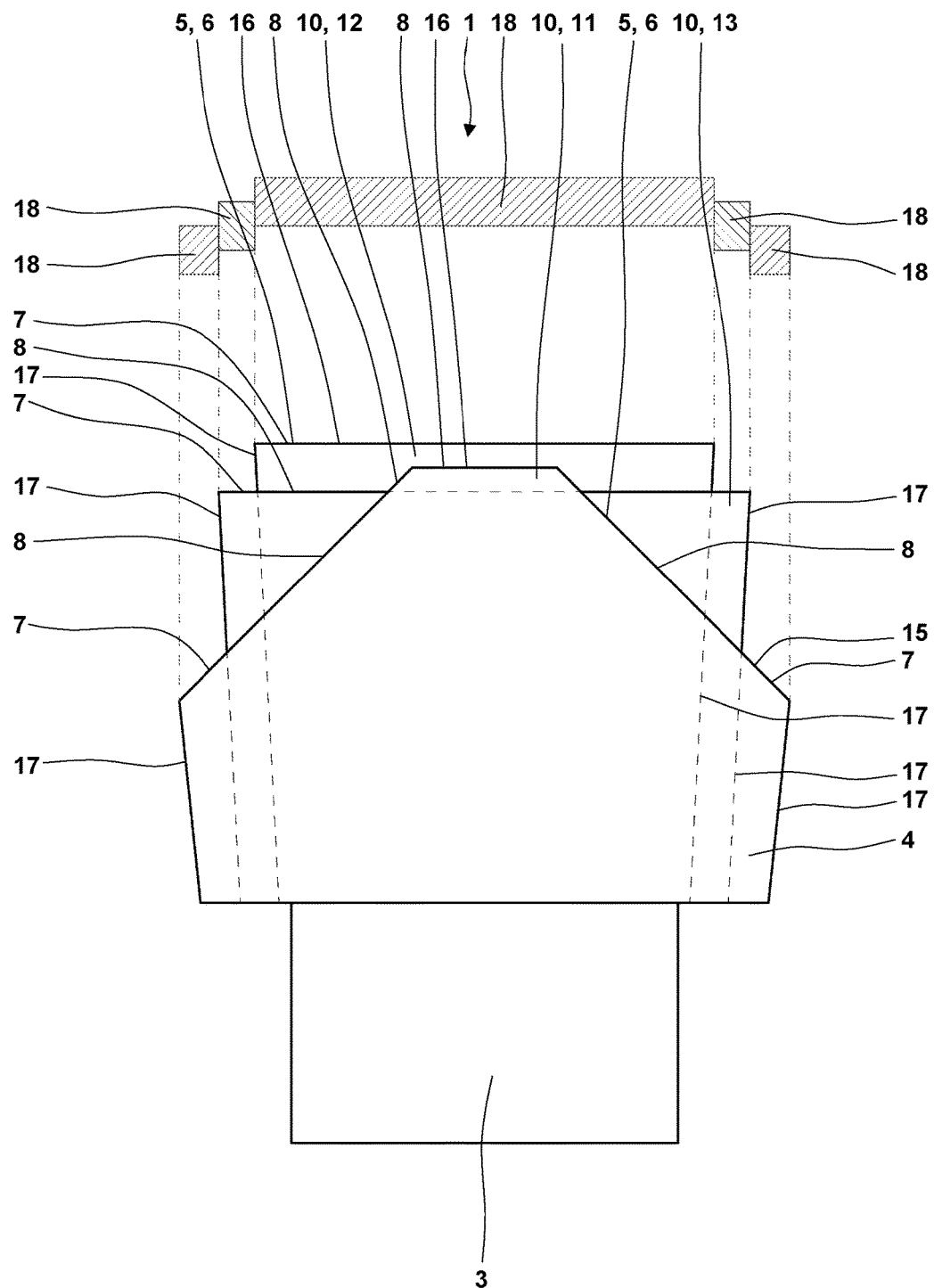
FIG. 18 illustrates a thirteenth exemplary embodiment of the new saw band in a front view illustrating the cutting channel portions.

FIG. 18 illustrates a view corresponding to FIG. 4 of another exemplary embodiment of the new saw band 1. The saw band 1 includes three geometrically differently designed teeth 10 in the group. The first tooth 11 is differently designed compared to the first exemplary embodiment of the saw band 1. It is not the highest tooth 10 in the group. The first tooth 11 thus is designed as a pure surface tooth. Furthermore, it is designed as a positively conical tooth having a flank angle of approximately 6°. The second tooth 12 and the third tooth 13 are each designed not to be chamfered, and they have a flank angle of approximately 3°. The teeth 12 and 13 are designed as pure performance teeth. The tooth 12 is the highest tooth 10 in the group. The third tooth 13 is designed as a chip separator tooth. In this way, five cutting channel portions 18 are produced by three geometrically differently designed teeth 10.

Figure 19:
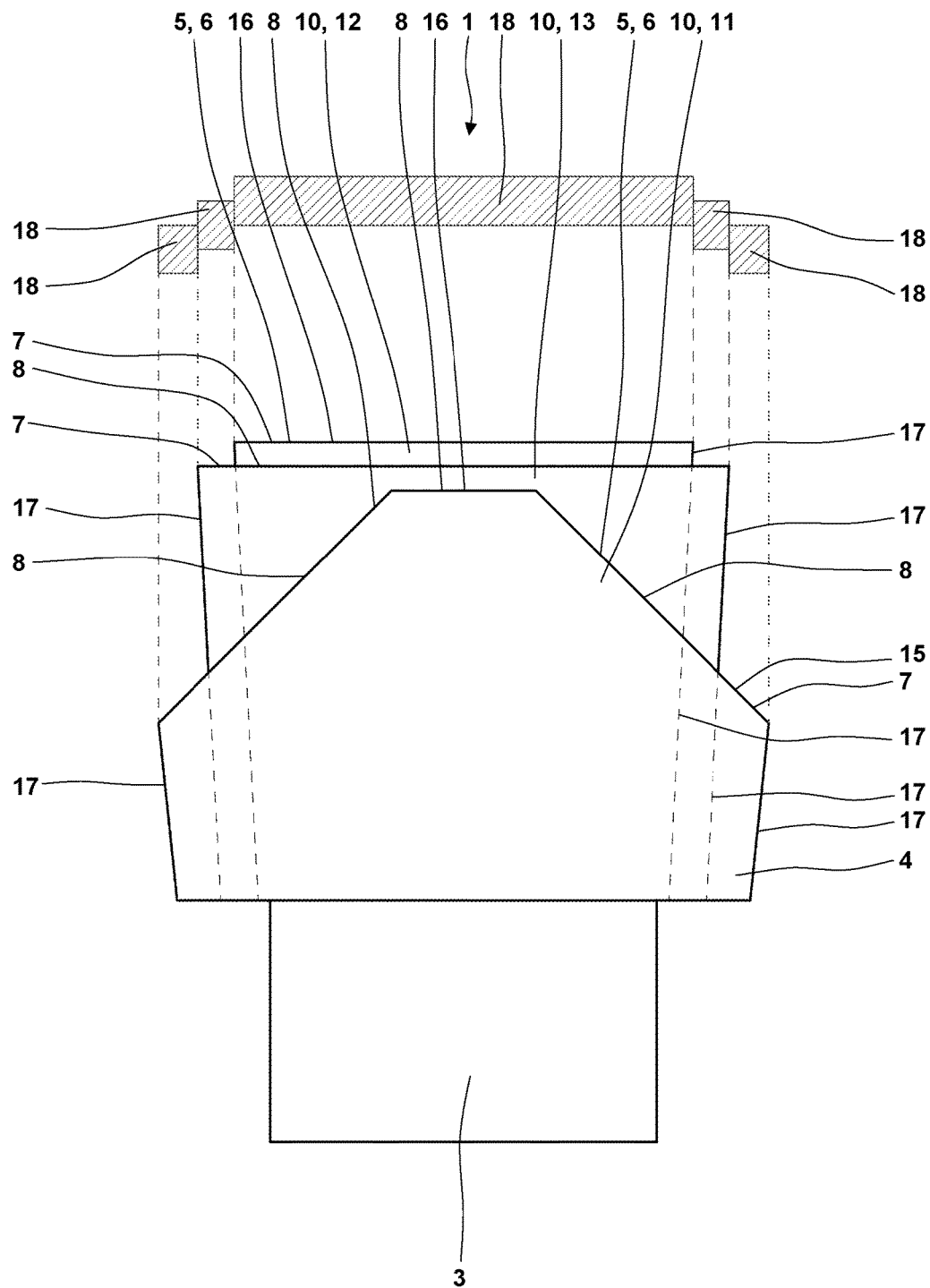
FIG. 19 illustrates a fourteenth exemplary embodiment of the new saw band in a front view illustrating the cutting channel portions.

FIG. 19 illustrates another exemplary embodiment of the new saw band 1 being similar to the embodiment illustrated in FIG. 18. In this case, the first tooth 11 is even designed as the smallest tooth 10 in the group. The third tooth 13 is designed as a chip separator tooth. In this way, five cutting channel portions 18 are produced by three geometrically differently designed teeth 10.

Figure 20:
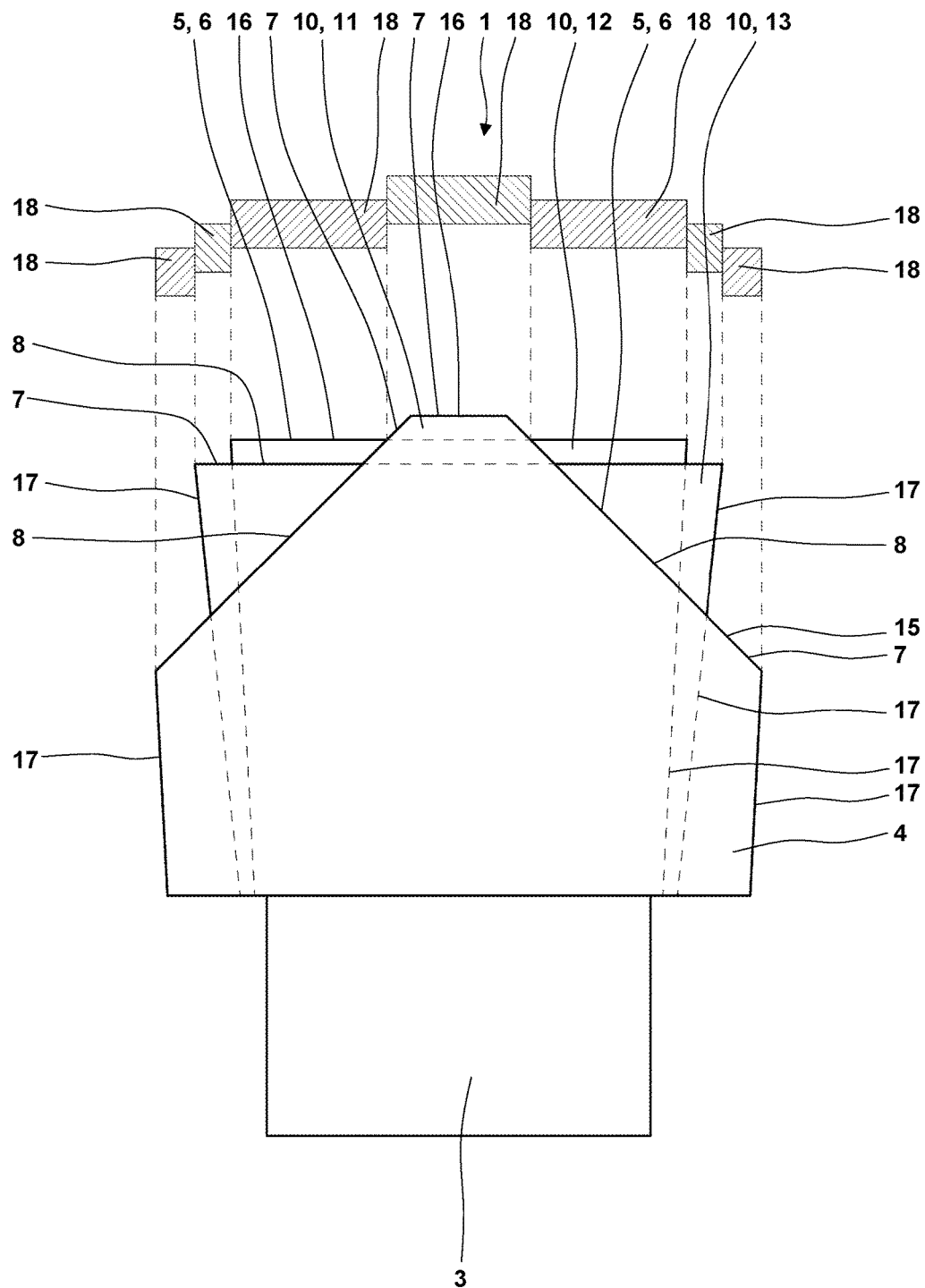
FIG. 20 illustrates a fifteenth exemplary embodiment of the new saw band in a front view illustrating the cutting channel portions.

FIG. 20 illustrates a view corresponding to FIG. 4 of another exemplary embodiment of the new saw band 1. The saw blade 1 includes three geometrically differently designed teeth 10 in the group. The first tooth 11 is designed to be similar to the one of the first exemplary embodiment of the saw blade 1, but it has a flank angle of approximately 3°. The first tooth 11 is designed as a combined performance and surface tooth and as a positively conical tooth. The second tooth 12 and the third tooth 13 are each designed not to be chamfered, as performance teeth and as positively conical teeth. The second tooth 12 has a flank angle of approximately 3°. The third tooth 13 has a flank angle of approximately 6°. Both teeth 12, 13 are designed as chip separator teeth. The teeth 12 and 13 functionally commonly form a chip separator tooth. In this way, seven cutting channel portions 18 are produced by three geometrically differently designed teeth 10.

Figure 21:
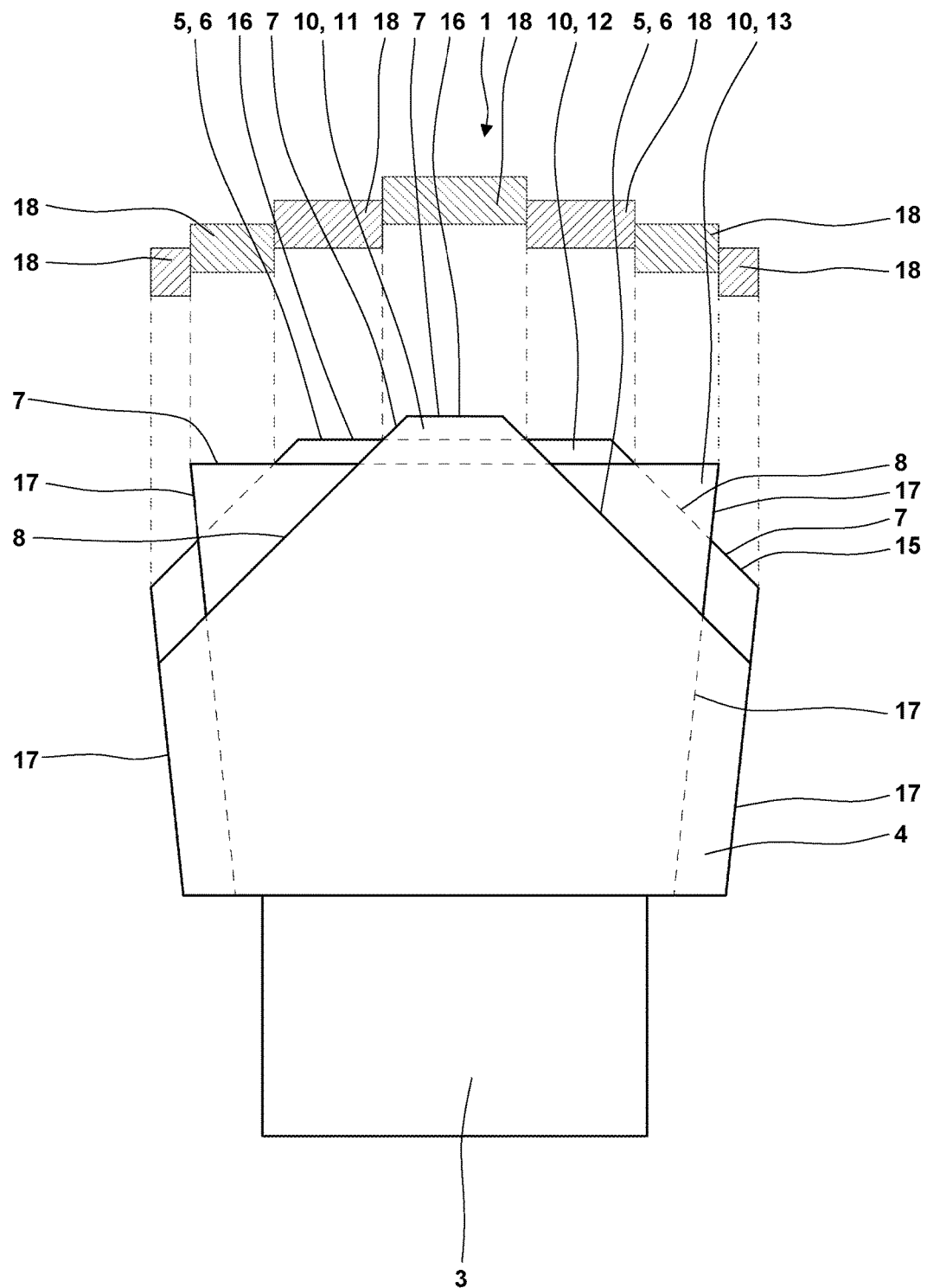
FIG. 21 illustrates an sixteenth exemplary embodiment of the new saw band in a front view illustrating the cutting channel portions.

FIG. 21 illustrates a view corresponding to FIG. 4 of another exemplary embodiment of the new saw band 1. This embodiment has some common features to the embodiment illustrated in FIG. 10. In contrast thereto, the first tooth 11 is only designed as a performance tooth, but not as a surface tooth. This functionality is provided by the second tooth 12. The flank 17 of the second tooth 12 intersects the flank 17 of the first tooth 11, and further seen in the direction of the tooth supporting body 2, it coincides therewith (in this view). Consequently, the second tooth 12 is no chip separator tooth. The only chip separator tooth in the group is the tooth 13. In this way, five cutting channel portions 18 are produced by three geometrically differently designed teeth 10.

Figure 22:
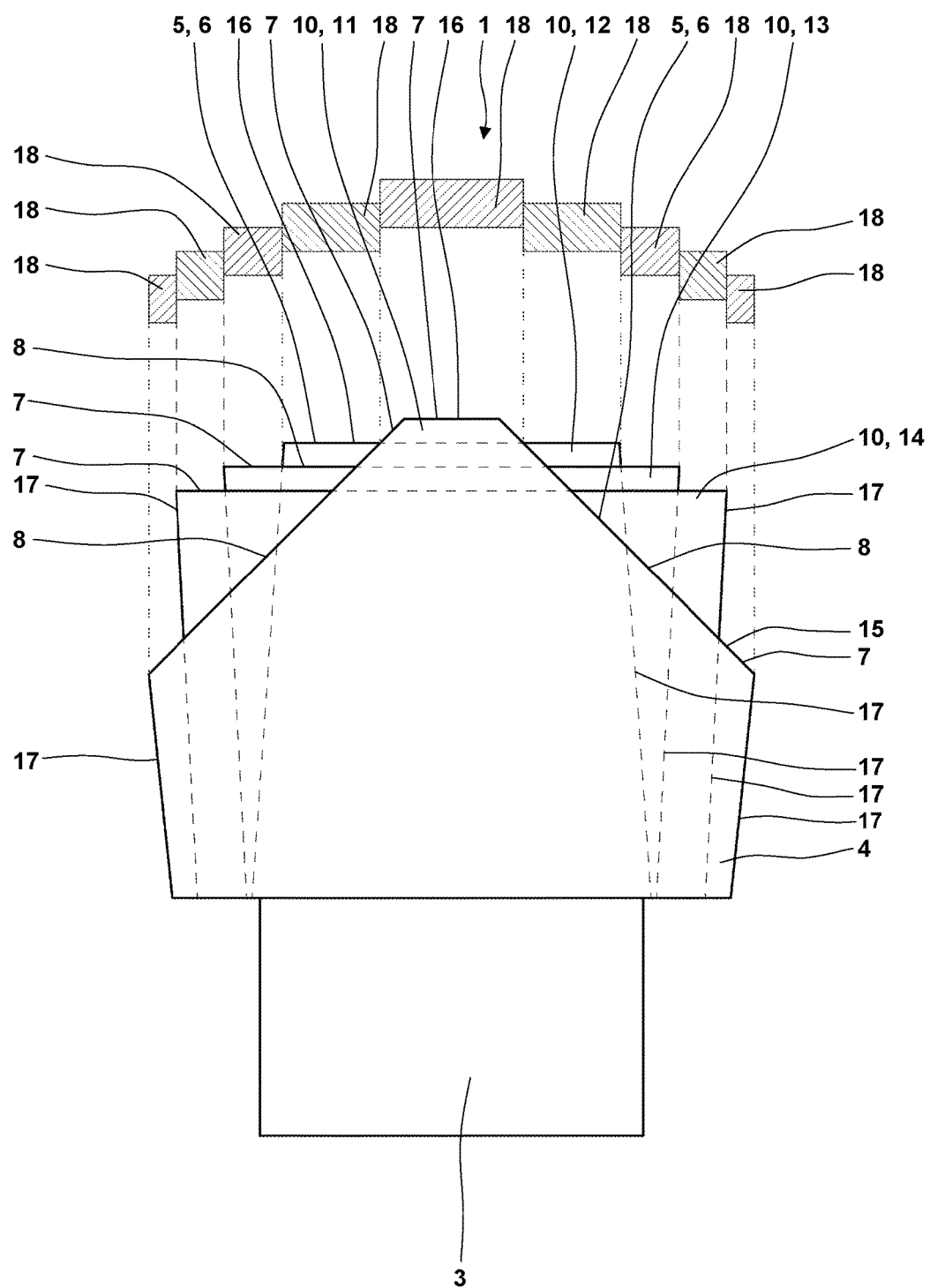
FIG. 22 illustrates a seventeenth exemplary embodiment of the new saw band in a front view illustrating the cutting channel portions.

FIG. 22 illustrates a view corresponding to FIG. 4 of another exemplary embodiment of the new saw band 1. The saw band 1 includes four geometrically differently designed teeth 10 in the group. The first tooth 11 once again is designed to be similar to the one of the first exemplary embodiment of the saw band 1. The first tooth 11 is designed as a combined performance and surface tooth and as a positively conical tooth. It is the only chamfered tooth 10 in the group. The further teeth 12, 13 and 14 are thus designed as teeth 10 not being chamfered. The second tooth 12 has a flank angle of approximately −4° and is thus designed as a negatively conical tooth. The third tooth 13 has a flank angle of approximately 6° and is thus designed as a positively conical tooth. The fourth tooth 14 has a flank angle of approximately 3° and it is thus also designed as a positively conical tooth. The teeth 12, 13 and 14 functionally commonly form a chip separator tooth. In this way, nine cutting channel portions 18 are produced by four geometrically differently designed teeth 10.

Figure 23:
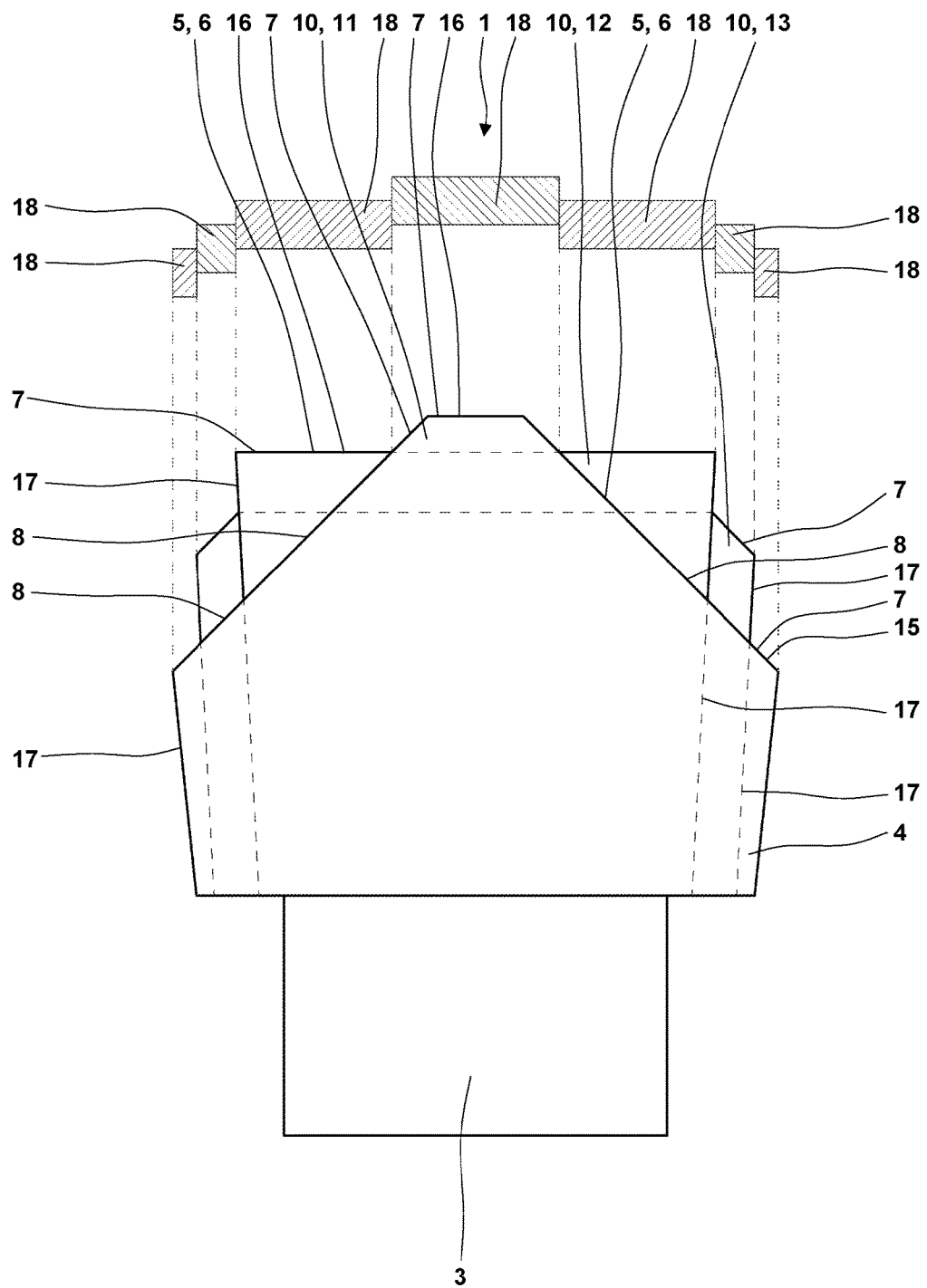
FIG. 23 illustrates an eighteenth exemplary embodiment of the new saw band in a front view illustrating the cutting channel portions.

FIG. 23 illustrates a view corresponding to FIG. 4 of another exemplary embodiment of the new saw band 1. The saw band 1 includes three geometrically differently designed teeth 10 in the group. The first tooth 11 is designed in the same way as in the first exemplary embodiment of the saw band 1. The first tooth 11 is designed as a combined performance and surface tooth and as a positively conical tooth. The second tooth 12 is designed to be chamfered, and it has a positive flank angel of approximately 3°. The third tooth 13 is designed to be chamfered, and it also has a positive flank angle of approximately 3°. The teeth 12 and 13 functionally commonly form a chip separator tooth. In this way, seven cutting channel portions 18 are produced by three geometrically differently designed teeth 10.

Figure 24:
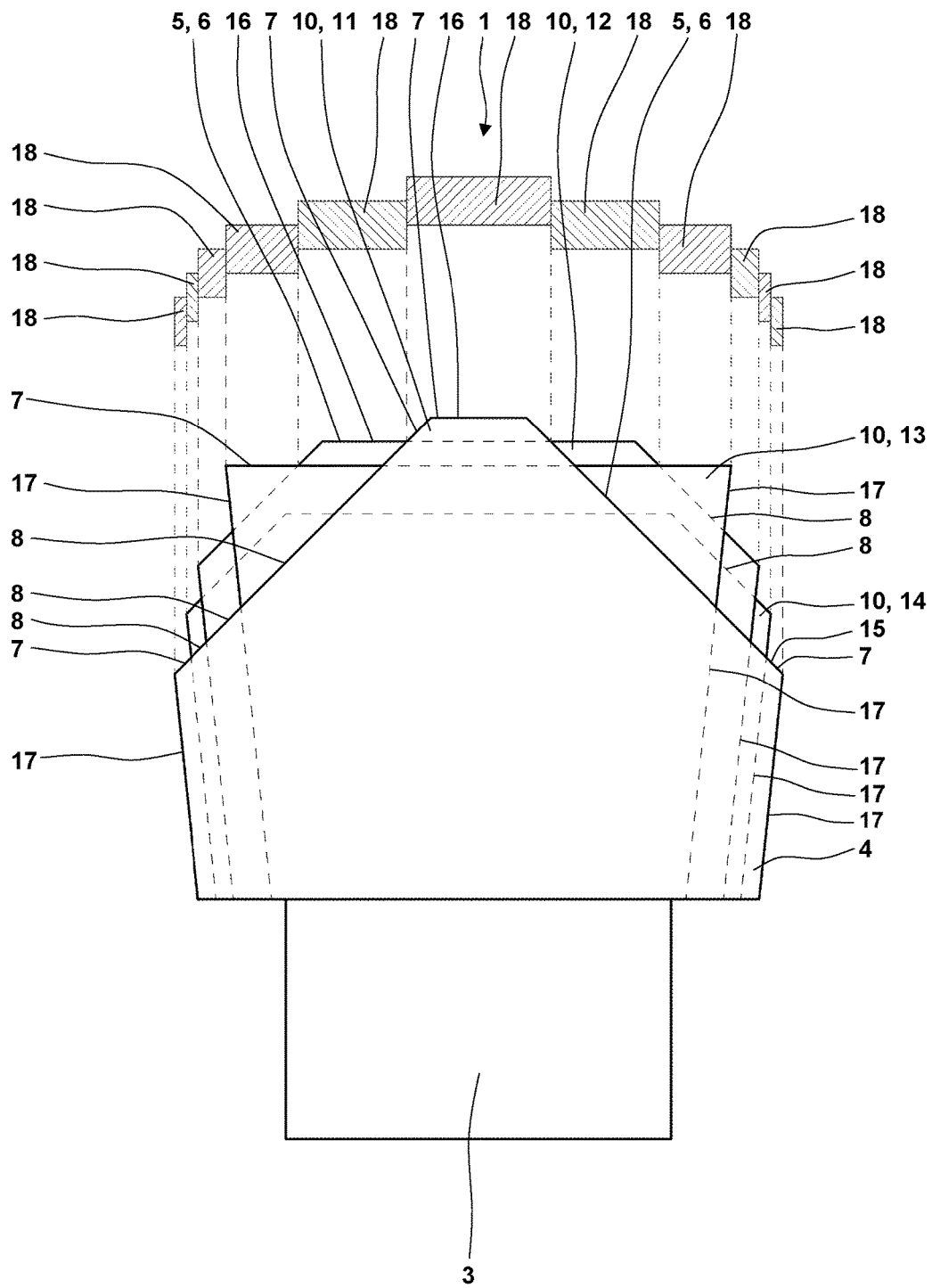
FIG. 24 illustrates a nineteenth exemplary embodiment of the new saw band in a front view illustrating the cutting channel portions.

FIG. 24 illustrates a view corresponding to FIG. 4 of another exemplary embodiment of the new saw band 1. The saw band 1 includes four geometrically differently designed teeth 10 in the group. The first tooth 11 is designed to be similar to the one of the first exemplary embodiment of the saw band 1, but it has a flank angle of approximately 3°. The first tooth 11 is designed as a combined performance and surface tooth and as a positively conical tooth. The second tooth 12 and the fourth tooth 14 are each designed to be chamfered. The third tooth 13 is designed not to be chamfered. The teeth 12, 13 and 14 each have a flank angle of approximately 3°. The third tooth 13 is designed as a chip separator tooth in relation to the second tooth 12. The teeth 12 and 14 functionally commonly form a chip separator tooth in relation to the first tooth 11. In this way, there is a total functional number of two chip separator teeth. In this way, eleven cutting channel portions 18 are produced by four geometrically differently designed teeth 10.

Figure 25:
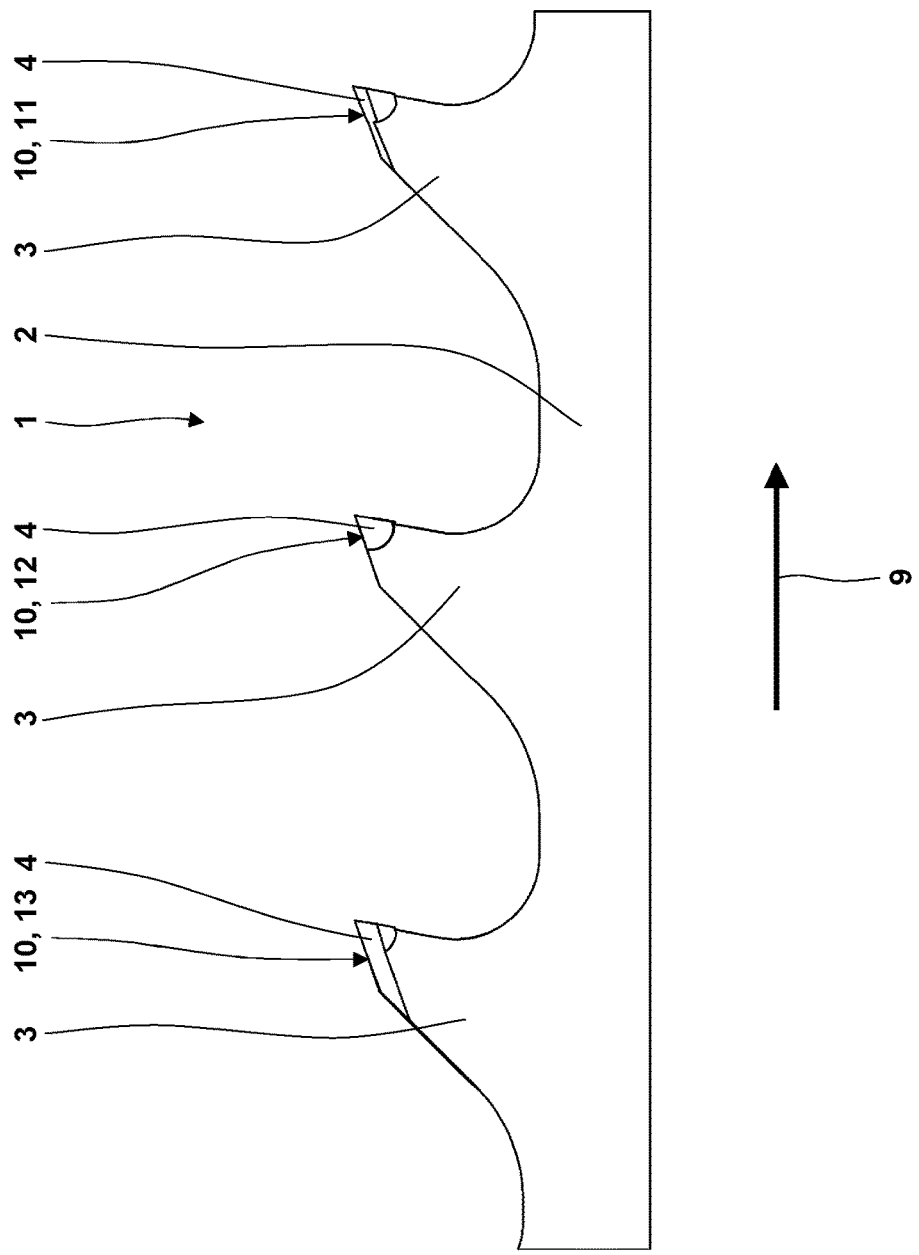
FIG. 25 illustrates a side view of a twentieth exemplary embodiment of the new saw band.
Figure 26:
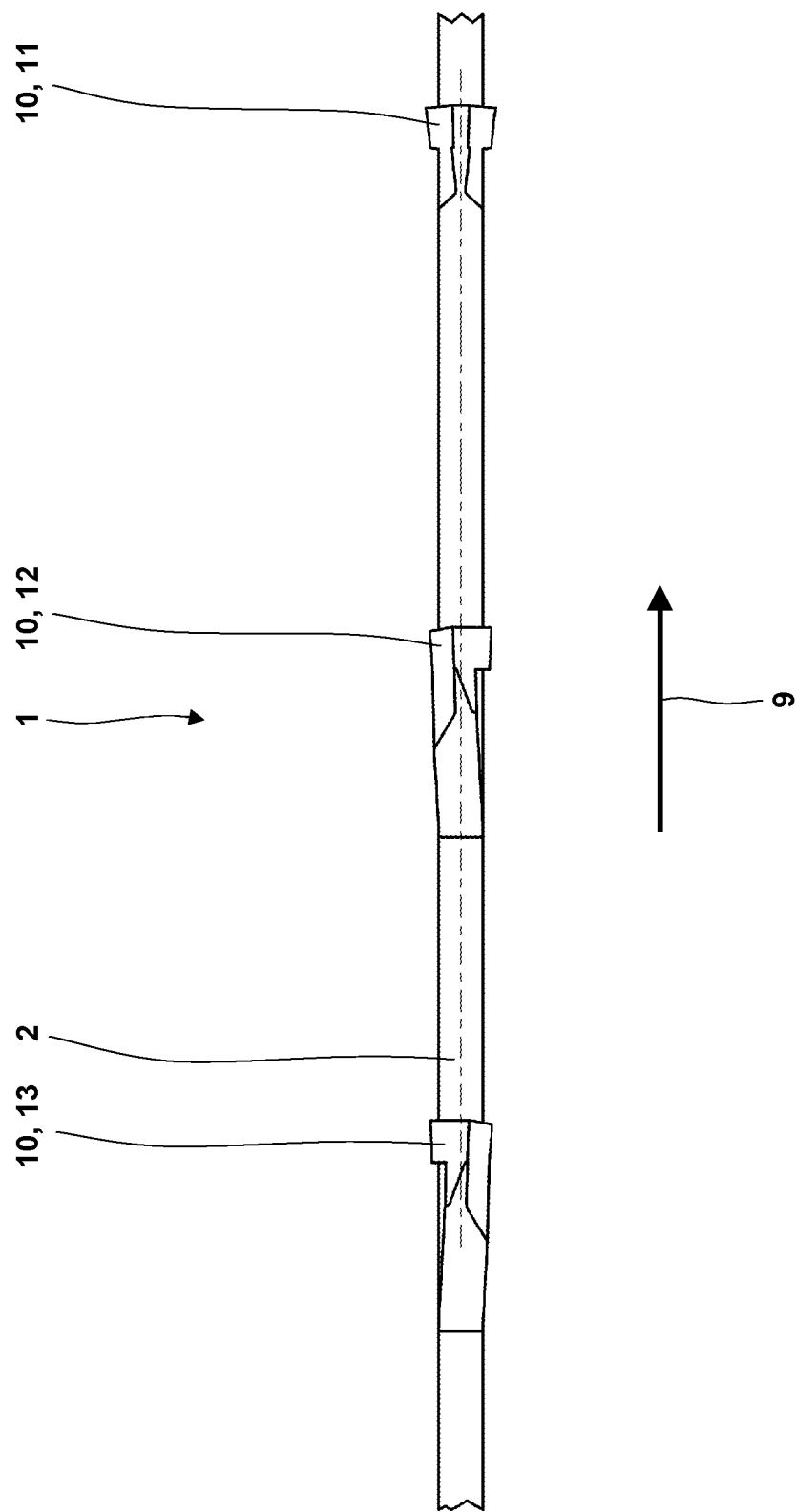
FIG. 26 illustrates the saw band according to FIG. 25 in a top view.
Figure 27:
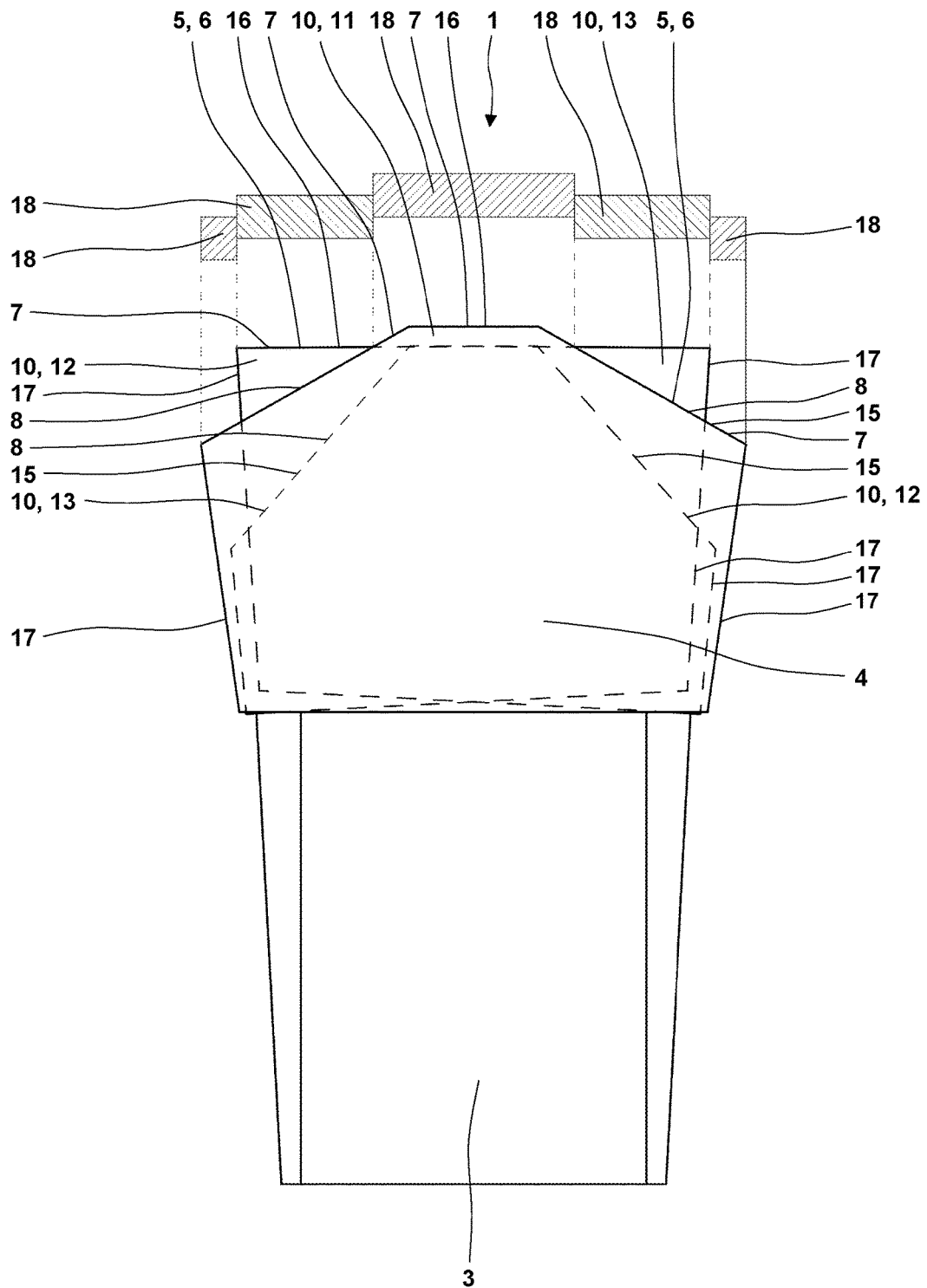
FIG. 27 illustrates the saw band according to FIG. 25 in a front view illustrating the cutting channel portions.

FIGS. 25-27 illustrate views corresponding to FIGS. 1, 2 and 4 of another exemplary embodiment of the new saw band 1. The saw band 1 includes three geometrically differently designed teeth 10 in the group. The first tooth 11 has a chamfer angle of 30°. The first tooth 11 is designed as a combined performance and surface tooth and as a positively conical tooth. The first tooth 11 has a flank angle of approximately 6°. The teeth 12 and 13 are designed as set teeth 10. In this case, the tooth 12 is the tooth 10 working at the lift side of the saw band 1 as seen in the direction of band movement 9. Correspondingly, the tooth 13 is the tooth 10 working at the right side of the saw band 1 as seen in the direction of band movement 9. The teeth 12, 13 are designed not to be chamfered in their effective portion. They have a positive flank angle of approximately 3°. The teeth 12 and 13 are each designed as a chip separator tooth. However, they only fulfill their function each at one side of the longitudinal center plane of the saw band 1. They thus functionally act as one chip separator tooth. In this way, five cutting channel portions 18 are produced by three geometrically differently designed teeth 10.

Figure 28:
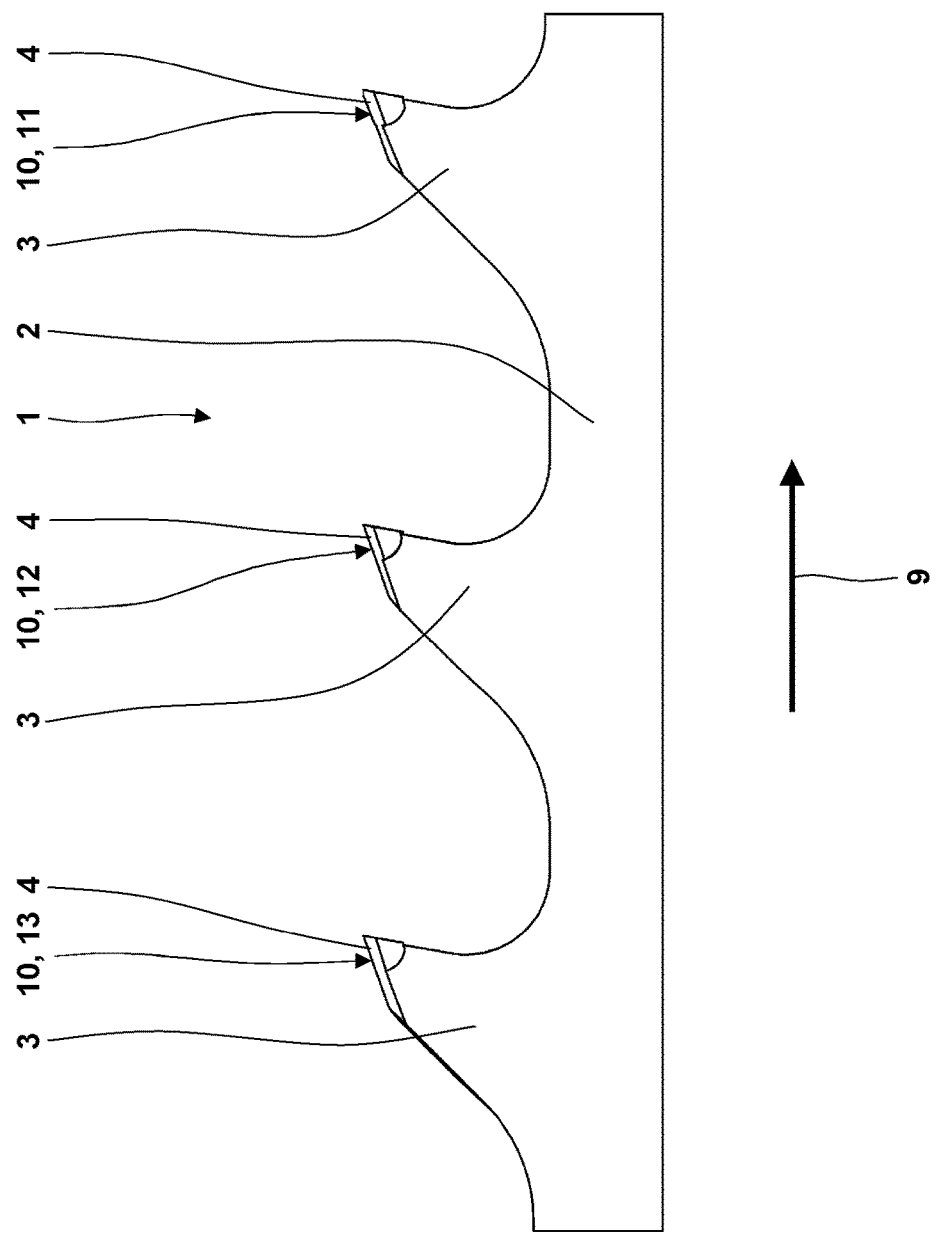
FIG. 28 illustrates a side view of a twenty-first exemplary embodiment of the new saw band.
Figure 29:
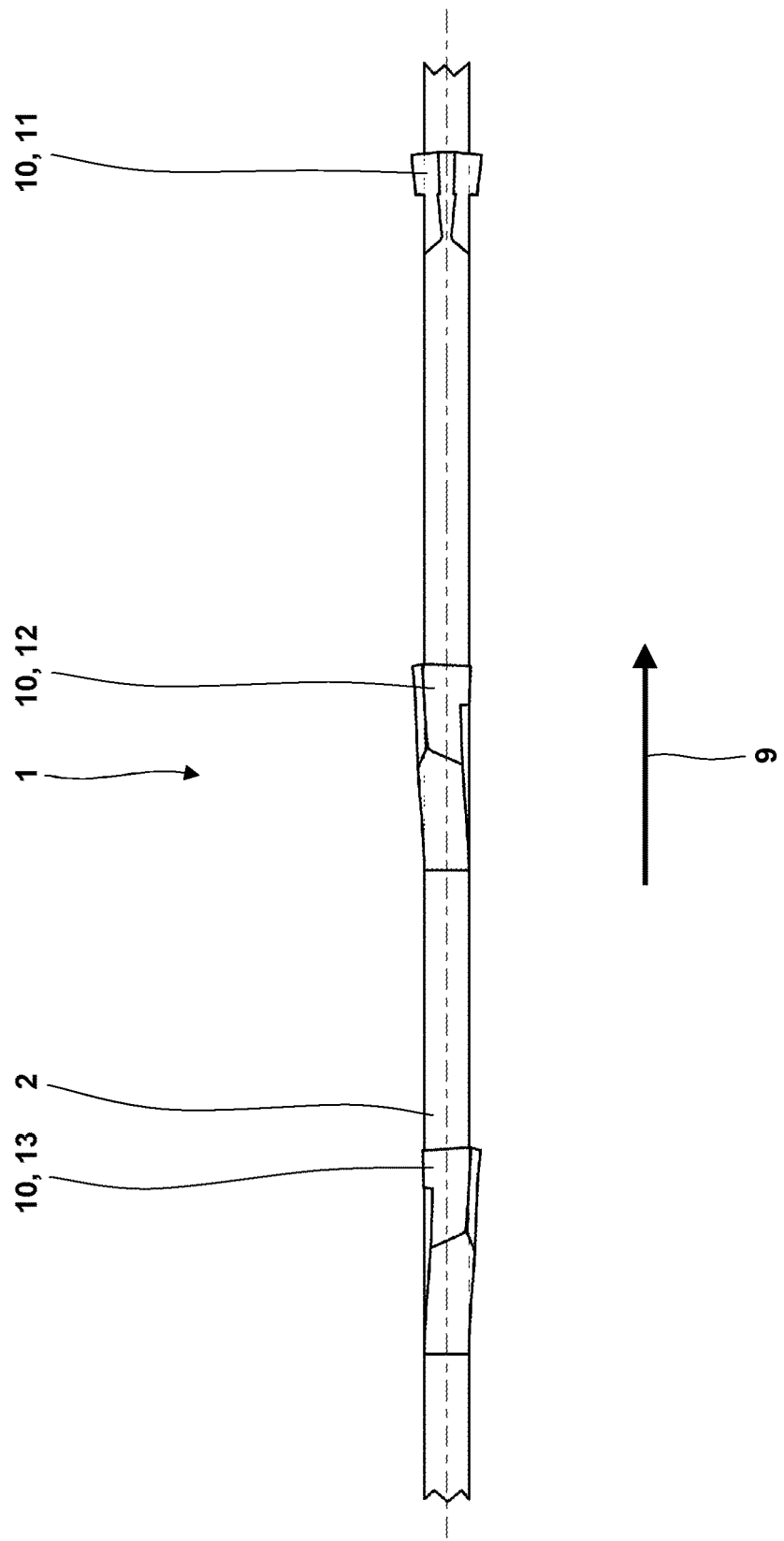
FIG. 29 illustrates the saw band according to FIG. 28 in a top view.
Figure 30:
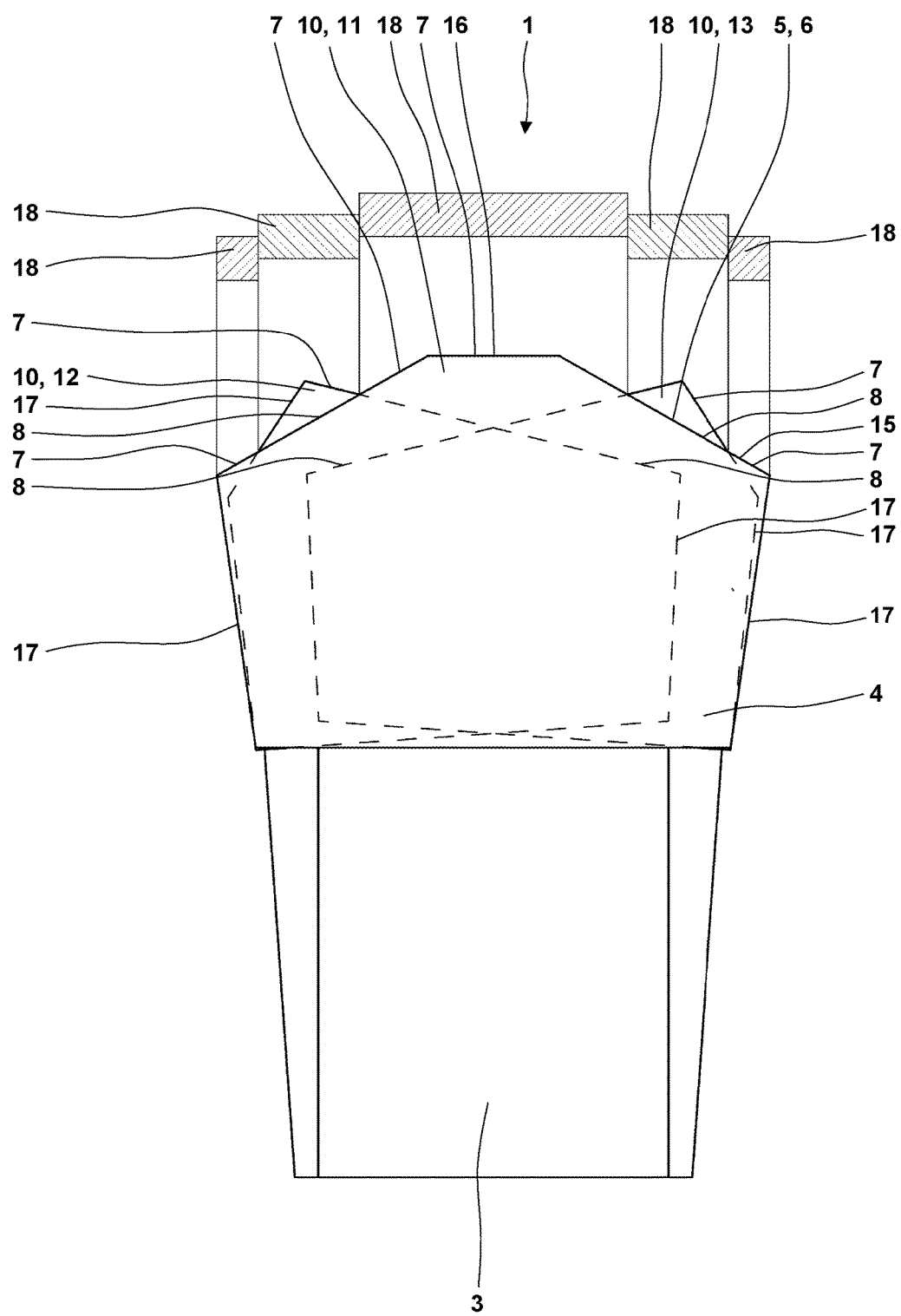
FIG. 30 illustrates the saw band according to FIG. 28 in a front view illustrating the cutting channel portions.

FIGS. 28-30 illustrate views corresponding to FIGS. 1, 2 and 4 of another exemplary embodiment of the new saw band 1. The saw band 1 includes three geometrically differently designed teeth 10 in the group. The first tooth 10 has a chamfer angle of 30°. The second tooth 11 is designed as a combined performance and surface tooth and as a positively conical tooth. The first tooth 11 has a flank angle of approximately 6°. The teeth 12 and 13 are designed as set teeth 10. In this case, the tooth 12 is set towards the left and the tooth 13 is set towards the right. The teeth 12, 13 are designed to be chamfered, and they have a chamfer angle of approximately 45°. They furthermore have a positive flank angle of approximately 3°. The teeth 12 and 13 are each designed as a chip separator tooth. However, they only fulfill their function each at one side of the longitudinal center plane of the saw band 1. They thus functionally act as one chip separator tooth. In this way, five cutting channel portions 18 are produced by three geometrically differently designed teeth 10.

Figure 31:
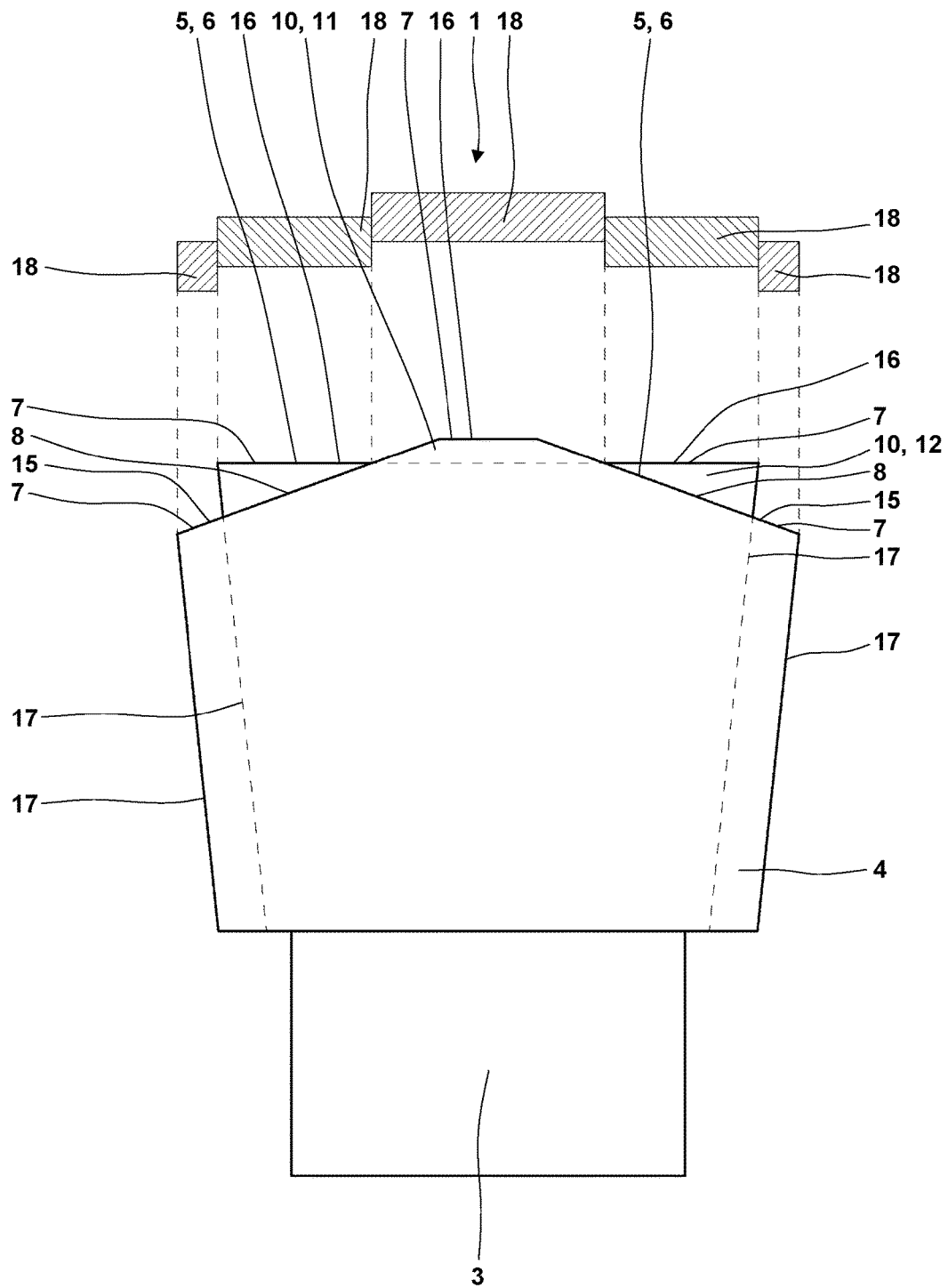
FIG. 31 illustrates a twenty-second exemplary embodiment of the new saw band in a front view illustrating the cutting channel portions.

FIG. 31 illustrates a view corresponding to FIG. 4 of another exemplary embodiment of the new saw band 1. The saw band 1 includes two geometrically differently designed teeth 10 in the group. The first tooth 11 has a chamfer angle of approximately 20°. The first tooth 11 is designed as a combined performance and surface tooth and as a positively conical tooth. In this way, five cutting channel portions 18 are produced by two geometrically differently designed teeth 10.

Figure 32:
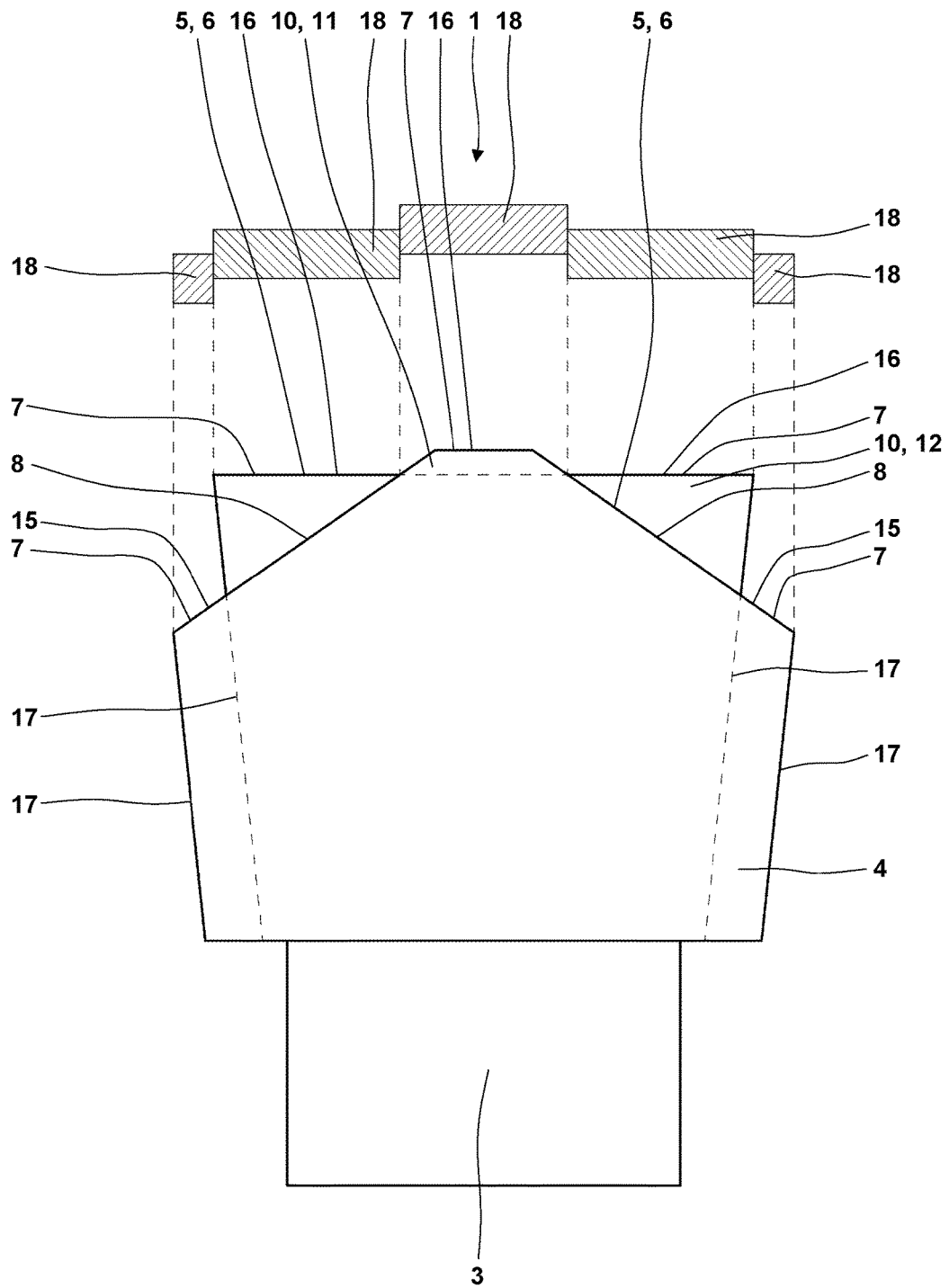
FIG. 32 illustrates a twenty-third exemplary embodiment of the new saw band in a front view illustrating the cutting channel portions.

FIG. 32 illustrates a view corresponding to FIG. 4 of another exemplary embodiment of the new saw band 1. The saw band 1 includes two geometrically differently designed teeth 10 in the group. The first tooth 11 has a chamfer angle of approximately 35°. The first tooth 11 is designed as a combined performance and surface tooth and as a positively conical tooth. In this way, five cutting channel portions 18 are produced by two geometrically differently designed teeth 10.

Many variations and modifications may be made to the preferred embodiments of the invention without departing substantially from the spirit and principles of the invention. All such modifications and variations are intended to be included herein within the scope of the present invention, as defined by the following claims.

We claim:

1. A saw band of metal for cutting work pieces of metal, comprising:
   a tooth supporting body; and
   a group of teeth being repeated along the tooth supporting body, the group including a first tooth and a second tooth,
   the first tooth including a chamfer, two effective cutting edge portions being arranged in the region of the chamfer and a flank being connected to the chamfer,
   the first tooth being designed as a positively conical tooth with a positive flank angle,
   the first tooth being designed as a combined performance and surface tooth and as the tooth having the greatest height in the group, the second tooth including a flank, the second tooth being designed as a positively conical tooth with a positive flank angle, the second tooth being designed as a chip separator tooth in relation to the first tooth, the second tooth being designed and arranged such that its flank in the view from the front intersects the chamfer of the first tooth and does not overlap the flank of the first tooth, and the first tooth including an ineffective cutting edge portion being formed between its effective cutting edge portions, the ineffective cutting edge portion being caused by the second tooth overlapping this ineffective cutting edge portion.

2. The saw band of claim 1, wherein the second tooth is not chamfered.

3. The saw band of claim 1, wherein the second tooth is unset.

4. The saw band of claim 1, wherein the group only includes two geometrically differently designed teeth.

5. The saw band of claim 1, wherein the group only includes three geometrically differently designed teeth.

6. The saw band of claim 5, wherein the third tooth is designed as a chip separator tooth in relation to the second tooth.

7. The saw band of claim 5, wherein two teeth in the group are set.

8. The saw band of claim 1, comprising:

only two geometrically differently designed teeth forming five cutting channel portions, or only three geometrically differently designed teeth forming seven cutting channel portions, or only three geometrically differently designed teeth forming nine cutting channel portions.

9. The saw band of claim 1, wherein the first tooth includes a cutting edge having an outer end, the saw band is designed and arranged such it forms a cutting channel in the work piece during cutting, the cutting channel having a width, the second tooth is designed and arranged such that its flank in the view from the front intersects the chamfer of the first tooth at a distance from the adjacent outer end of the cutting edge of the first tooth in the direction of the width of the cutting channel, the distance corresponding to at least 5% of the width of the cutting channel.

10. A saw band of metal for cutting work pieces of metal, comprising:

a tooth supporting body; and a group of teeth being repeated along the tooth supporting body, the group including only three geometrically differently designed teeth, namely a first tooth, a second tooth and a third tooth, the first tooth including a chamfer, two effective cutting edge portions being arranged in the region of the chamfer and a flank being connected to the chamfer, the first tooth being designed as a positively conical tooth with a positive flank angle, the first tooth being designed as a combined performance and surface tooth and as the tooth having the greatest height in the group, the second tooth including a chamfer, two effective cutting edge portions being arranged in the region of the chamfer and a flank being connected to the chamfer, the second tooth being designed as a positively conical tooth with a positive flank angle, the second tooth being designed as a chip separator tooth in relation to the first tooth, the second tooth being designed and arranged such that its flank in the view from the front intersects the chamfer of the first tooth and does not overlap the flank of the first tooth, the first tooth including an ineffective cutting edge portion being formed between its effective cutting edge portions, the ineffective cutting edge portion being caused by the second tooth overlapping this ineffective cutting edge portion, the third tooth including a flank, the third tooth being designed as a positively conical tooth with a positive flank angle, the third tooth being designed as a chip separator tooth in relation to the second tooth, the third tooth being designed and arranged such that its flank in the view from the front intersects the chamfer of the second tooth and does not overlap the flank of the second tooth, the second tooth including an ineffective cutting edge portion being formed between its effective cutting edge portions, the ineffective cutting edge portion being caused by the third tooth overlapping this ineffective cutting edge portion, the first tooth, second tooth and third tooth being designed and arranged to form nine cutting channel portions in the work piece during cutting.

\* \* \* \* \*